United States Patent [19]

Galdun et al.

[11] 4,254,473
[45] Mar. 3, 1981

[54] RACK ADAPTER FOR SERIALLY CONNECTED I/O INTERFACE RACKS

[75] Inventors: Daniel J. Galdun, Huntsburg; Raymond A. Grudowski, South Euclid; Valdis Grants, Lyndhurst, all of Ohio

[73] Assignee: Allen-Bradley Company, Milwaukee, Wis.

[21] Appl. No.: 7,554

[22] Filed: Jan. 29, 1979

[51] Int. Cl.³ .................. G06F 15/46; G06F 11/00; G06F 9/06
[52] U.S. Cl. .................. 364/900; 364/119
[58] Field of Search ... 364/200 MS File, 900 MS File, 364/104, 119; 371/22

[56] References Cited

U.S. PATENT DOCUMENTS

| | | | |
|---|---|---|---|
| 3,643,223 | 2/1975 | Ruth et al. | 364/200 |
| 3,810,105 | 5/1974 | England | 364/200 |
| 3,942,158 | 3/1976 | Dummermuth | 364/900 |
| 3,997,879 | 12/1976 | Markley et al. | 364/900 |
| 4,041,473 | 8/1977 | Bardotti et al. | 364/900 |
| 4,047,003 | 9/1977 | LaRocca et al. | 364/900 X |
| 4,104,731 | 8/1978 | Grudowski et al. | 364/900 |
| 4,118,792 | 10/1978 | Struger et al. | 364/900 |

Primary Examiner—Mark E. Nusbaum
Attorney, Agent, or Firm—Quarles & Brady

[57] ABSTRACT

A rack adapter for a programmable controller is included in each of four remotely located I/O interface racks that are connected in series to a central processor. The rack adapter includes a rack interface processor under program control which converts serial data received from the central processor to parallel data that is written into I/O modules in its rack. The rack interface processor also converts parallel data from I/O modules to serial data, which is sent back to the central processor through a select data out circuit in proper sequence with data from the other racks. The rack interface processor initiates the decontrol of machines connected to the four racks if a major transmission fault occurs, but the rack interface processor is tolerant to transmission errors caused by electrical noise. A dual-frequency clock drives the rack interface processor, and interface circuitry which is operable at two bit-transmission rates connects the rack interface processor to the communication channel, which can range up to 10,000 feet from the central processor.

17 Claims, 19 Drawing Figures

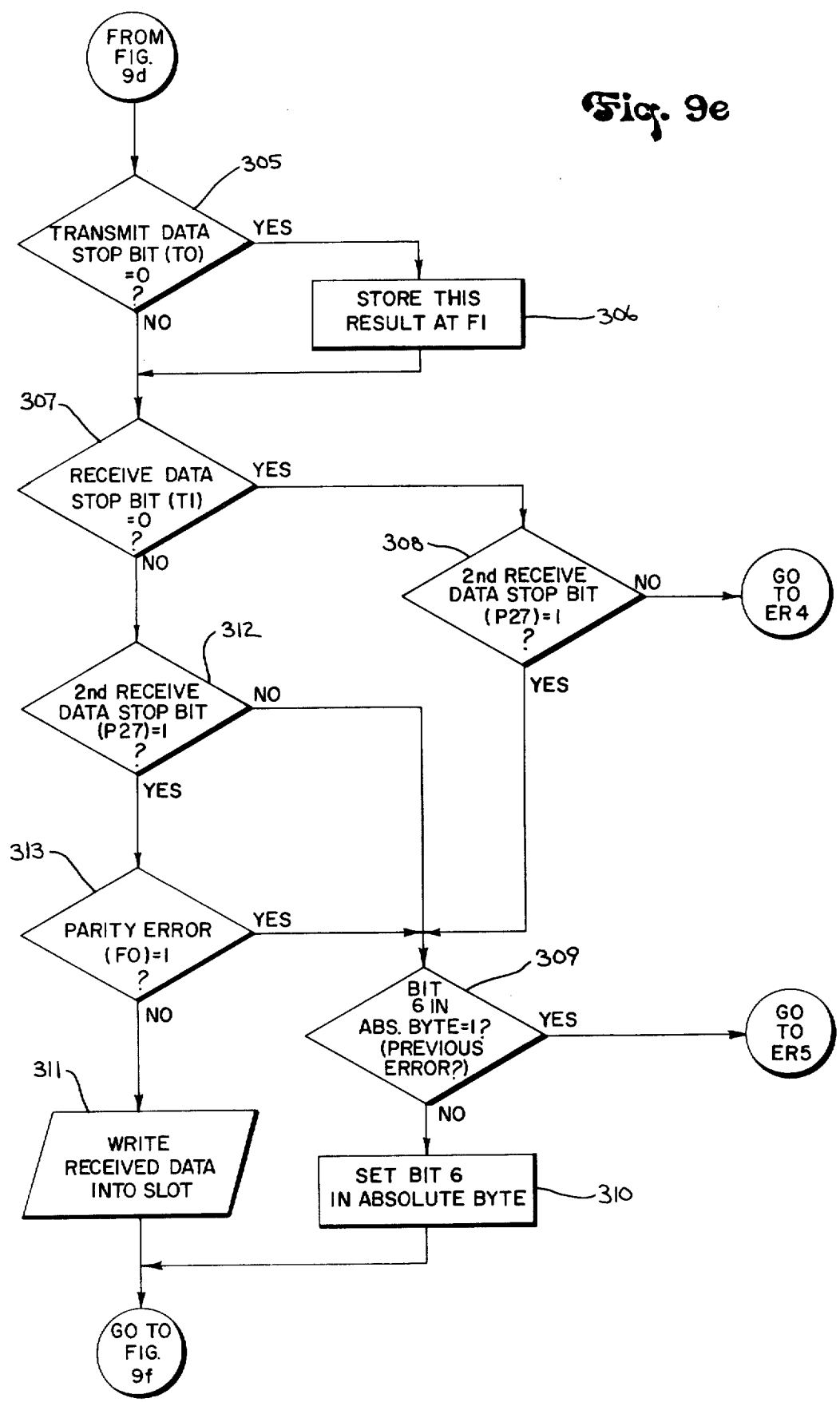

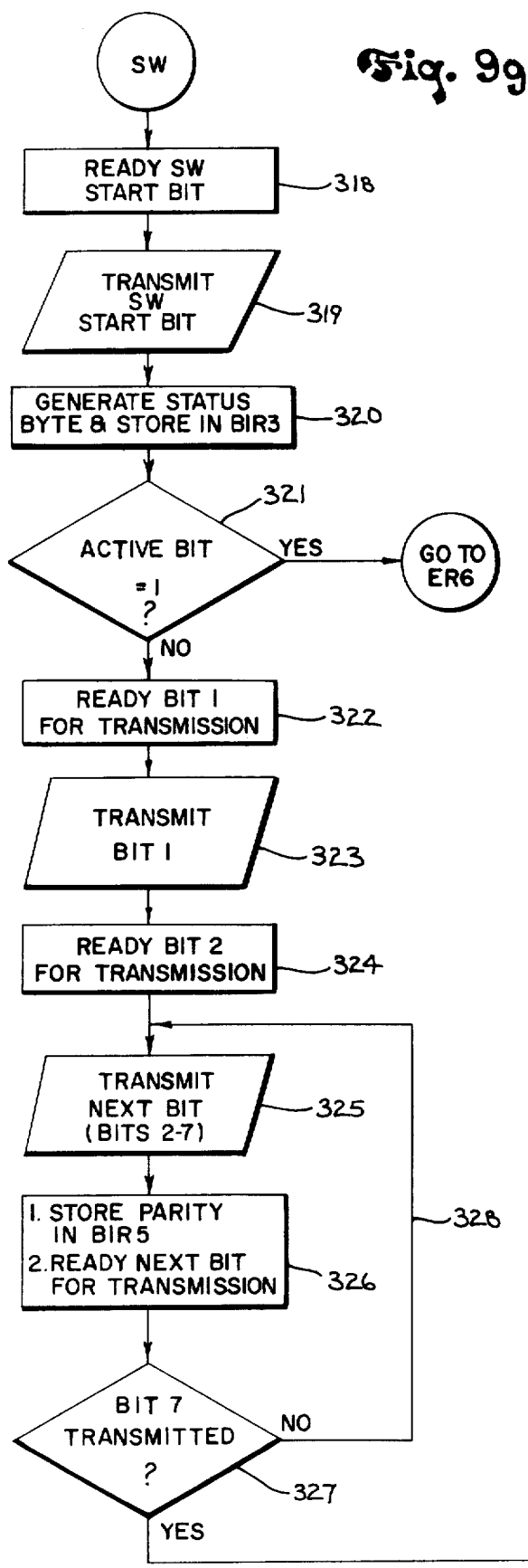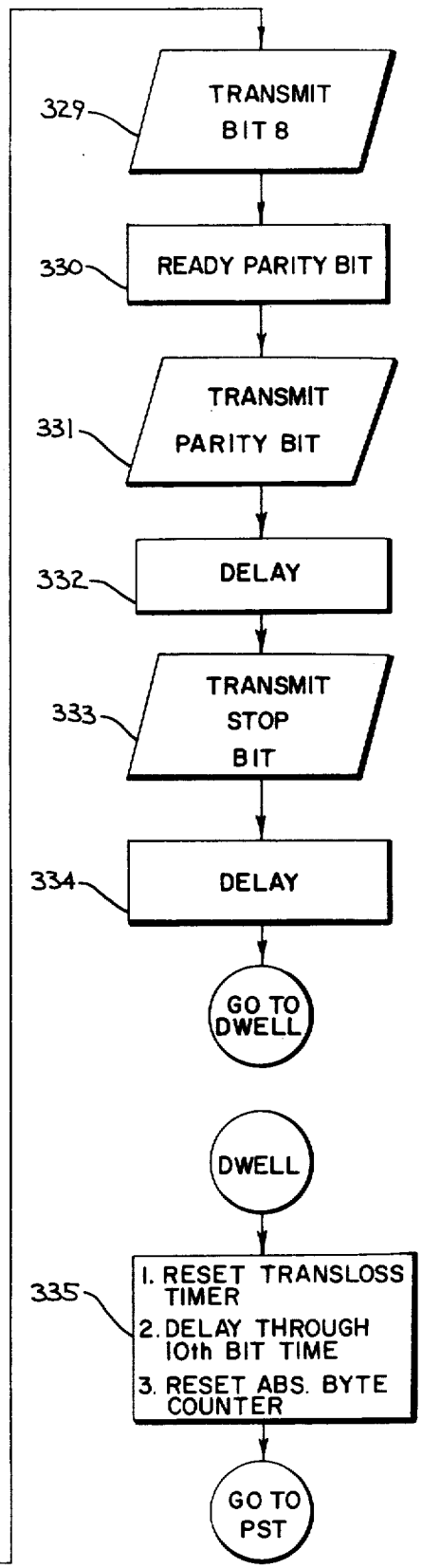
Fig. 9g

Fig. 11

BANK 1

| | |
|---|---|
| R7 | GENERAL PURPOSE |
| R6 | SERIAL DATA OUT MASK |
| R5 | TRANSMITTED DATA PARITY |
| R4 | RECEIVED DATA |
| R3 | TRANSMIT DATA OUT |
| R2 | PORT 2 REGISTER |
| R1 | POINTS TO B0 R4 |
| R0 | ABSOLUTE BYTE POINTER |

BANK 0

| | |
|---|---|
| R7 | DIP SWITCH STATUS |
| R6 | STARTING BYTE ADDRESS |
| R5 | ENDING BYTE ADDRESS |
| R4 | PORT 1 REGISTER |
| R3 | |
| R2 | PORT 2 REGISTER |
| R1 | COUNTER |
| R0 | ABSOLUTE BYTE POINTER |

| BIT 7 | BIT 6 | BIT 5 | BIT 4 | BIT 3 | BIT 2 | BIT 1 | BIT 0 |
|---|---|---|---|---|---|---|---|
| THIS RACK BIT | ERROR BIT | SELECT DATA BIT | UNPAIRED INPUT MODULE BIT | SLOT ADDRESS | | | |

Fig. 12

RACK ADAPTER FOR SERIALLY CONNECTED I/O INTERFACE RACKS

BACKGROUND OF THE INVENTION

1. Field of the Invention

The field of the invention is digital controllers, and more particularly programmable controllers in which I/O interface racks are remotely located from the central processor of the controller to control industrial machines and processes.

2. Description of the Prior Art

A programmable controller with a central processing station and remotely located interface racks is disclosed in Markley et al, U.S. Pat. No. 3,997,879, issued Dec. 14, 1976, and entitled "Fault Processor for Programmable Controller with Remote I/O Interface Racks." The controller includes a central processor, a memory, and an I/O scanner which are interconnected with one another and located at a central processing station. I/O interface racks, such as disclosed in Springer et al, U.S. Pat. No. 3,992,654, issued Nov. 21, 1977, are each connected by a separate cable to the I/O scanner circuit at the central processing station. Each I/O rack has a capacity of 128 input/output circuits which are arranged in eight rack slots having sixteen I/O circuits each. Each I/O circuit can be monitored or controlled by a single logic voltage signal, which is generated in response to a single bit of data. With the I/O racks connected in "parallel" communication channels to the I/O scanner circuit, and with proper connection through distribution panels and to remote power supplies, it is possible to locate each of the eight I/O racks up to 5,000 feet from the central processing station.

Each communication channel in this prior system is formed by a cable, which is connected on its opposite ends to a pair of universal asynchronous receiver/transmitters (UAR/T's). There is one UAR/T in the I/O scanner for each communication channel, and there is one UAR/T in a rack adapter in each I/O rack. The UAR/T's couple bytes of data from the central processor to the I/O rack slots by converting the data to serial data for transmission through the communication channels and by reassembling the serial data into data bytes at the I/O rack adapters.

The programmable controller described above is contemplated for use in an industrial environment where electrical noise can produce erroneous transmissions over the transmission cables. It has been observed in industry that electrical noise generally produces only a single transmission error within the time represented by several scans of the I/O scanner, which is typically less than 0.1 second. Thus, in the system above, the detection of a major fault requires two error signals on a single scan, or on two successive scans of an I/O interface rack by the I/O scanner. If a major fault is detected, the operating devices on a machine controlled by the faulted rack are decontrolled.

The monitoring of transmission errors is performed at each end of the transmission cables by the I/O scanner circuit and the rack adapter circuits in each of the I/O interface racks. Besides its UAR/T, the rack adapter circuit at each I/O rack is comprised of discrete components such as storage registers, data selectors, flip-flops, gates, counters, and others, which are wired together to perform the logic functions required in monitoring transmission errors.

There is need for greater flexibility and efficiency in the application of programmable controllers to industrial control tasks. It is desirable in a programmable controller to be able to place I/O interface racks at greater distances from the central processing station. It is also desirable to subdivide I/O interface racks into partial racks that can be spaced apart to perform a number of control tasks, none of which require all of the 128 I/O control circuits that are available in a full I/O interface rack.

SUMMARY OF THE INVENTION

The invention is embodied in a rack adapter for a digital controller in which I/O interface racks are connected in series through two-way communication channels to a central processor means. The I/O interface racks are interconnected by two-way serial communication cables that connect to serial I/O data ports on the rack adapters. Such adapters enable a single central processor means to control a distributed network of I/O interface racks. The configuration of the network is flexible, so that different numbers and different sizes of I/O interface racks can be combined in stringing the racks together to form communication channels.

Data flows back and forth through the communication channel between the central processor means and the serially connected I/O interface racks, with intermediate I/O interface racks coupling data between the central processor means and the last I/O interface rack in the communication channel. Each rack adapter receives data from the central processor means through a first serial data input, and each rack adapter transmits serial data back towards the central processor means through a first serial data output. Each rack adapter, except the last, also receives serial data from a next I/O interface rack through a second serial data input and transmits data to the next I/O interface rack through a second serial data output.

The rack adapter of the invention has first logic circuit means for coupling data received from the central processor means to the second serial data output, so that serial data is relayed to the next I/O interface rack. The rack adapter also has second logic circuit means for coupling data received from the next I/O interface rack to the first serial data output, so that serial data is relayed back to the central processor means. The rack adapter also includes rack interface processor means which is connected to both serial data inputs and to both logic circuit means to control the flow of data through the communication channel. The rack interface processor means is also connected through an address bus and a data bus to the input/output circuits in its I/O interface rack to couple multibit data words between these circuits and the central processor means. The rack interface processor means is also connected to clock means, and is coupled to memory means to execute program instructions which are read sequentially from the memory means in response to timing signals received from the clock means.

The rack interface processor means is responsive to selected program instructions to perform many processing and control tasks. It receives bits of data, serially, through the first serial data input and enables the coupling of these bits through the first logic circuit means to the second serial data output. It couples multibit data words between groups of input/output circuits and the memory means on the rack adapter. It selectively couples serial data bits through the second logic circuit to the first serial data output, and it detects faults associated with the receipt and transmission of data bits through the communication channel. Still others of these processing functions will be described in the detailed description of the invention.

While providing for remote, serially connected, I/O interface racks, the invention retains and expands the fault-detecting capability of previous remote I/O rack adapters. The rack interface processor means is responsive to certain program instructions to detect faults associated with the coupling of data between its I/O interface rack and the next I/O interface rack. Termination sensing circuit means have also been provided to sense the proper connection of the rack adapter to a rack adapter on another I/O interface rack.

To provide further flexibility in the arrangement of I/O interface racks, the invention allows the serial connection of a group of I/O interface racks. In place of a single I/O rack of maximum capacity, a number of I/O racks of smaller capacity can be distributed to remote locations and connected to one another through a serial communication channel. The rack interface processor means is responsive to certain program instructions and the setting of a group of DIP switches to set up an absolute byte area in the memory means, where the address locations for the I/O modules in that particular I/O rack are identified. The rack interface processor means is then further responsive to still other program instructions to control the second logic circuit means and to select data from either its I/O interface rack, or the second serial data input, according to adddressed I/O location, to send back to the central processor means in the digital controller.

The invention also provides a clock and a flip-flop which are connected together to provide dual frequency clock means. This dual frequency clock means can be connected to the rack interface processor means to control the bit rate at which serial data is received and transmitted. Input circuits which can be switched to receive data at varying data bit rates are also provided for connection to the first and second serial data inputs. This allows the communication channel between the central processing station and an I/O interface rack to extend anywhere in the range of 0–10,000 feet.

It is one object of the invention to provide a digital controller with remote I/O interface racks that can be connected in series.

It is another object of the invention to provide a digital controller with remote, serially connected, I/O interface racks, each having a capacity which is less than the capacity of the largest I/O rack that can be employed in the controller.

It is another object of the invention to expand the fault detection capability of a rack adapter circuit.

It is another object of the invention to permit the extension of each serial communication channel to anywhere in the range of 0–10,000 feet.

The foregoing and other objects and advantages of the invention will appear from the following description. In the description reference is made to the accompanying drawings, which form a part hereof, and in which there is shown by way of illustration a preferred embodiment of the invention. Such embodiment does not necessarily represent the full scope of the invention, however, and reference is therefore made to the claims herein for interpreting the scope of the invention.

BRIEF DESCRIPTION OF THE DRAWINGS

FIGS. 9a–9h are flow charts of the program which controls the operation of the microprocessor that forms a part of the rack adapter circuit of FIG. 3;

FIG. 11 is a more detailed map diagram of the working registers of the memory in FIG. 10; and FIG. 12 is a format diagram of an absolute data byte which is stored in selected registers of the memory mapped in FIG. 10.

DESCRIPTION OF THE PREFERRED EMBODIMENT

Figure 1:
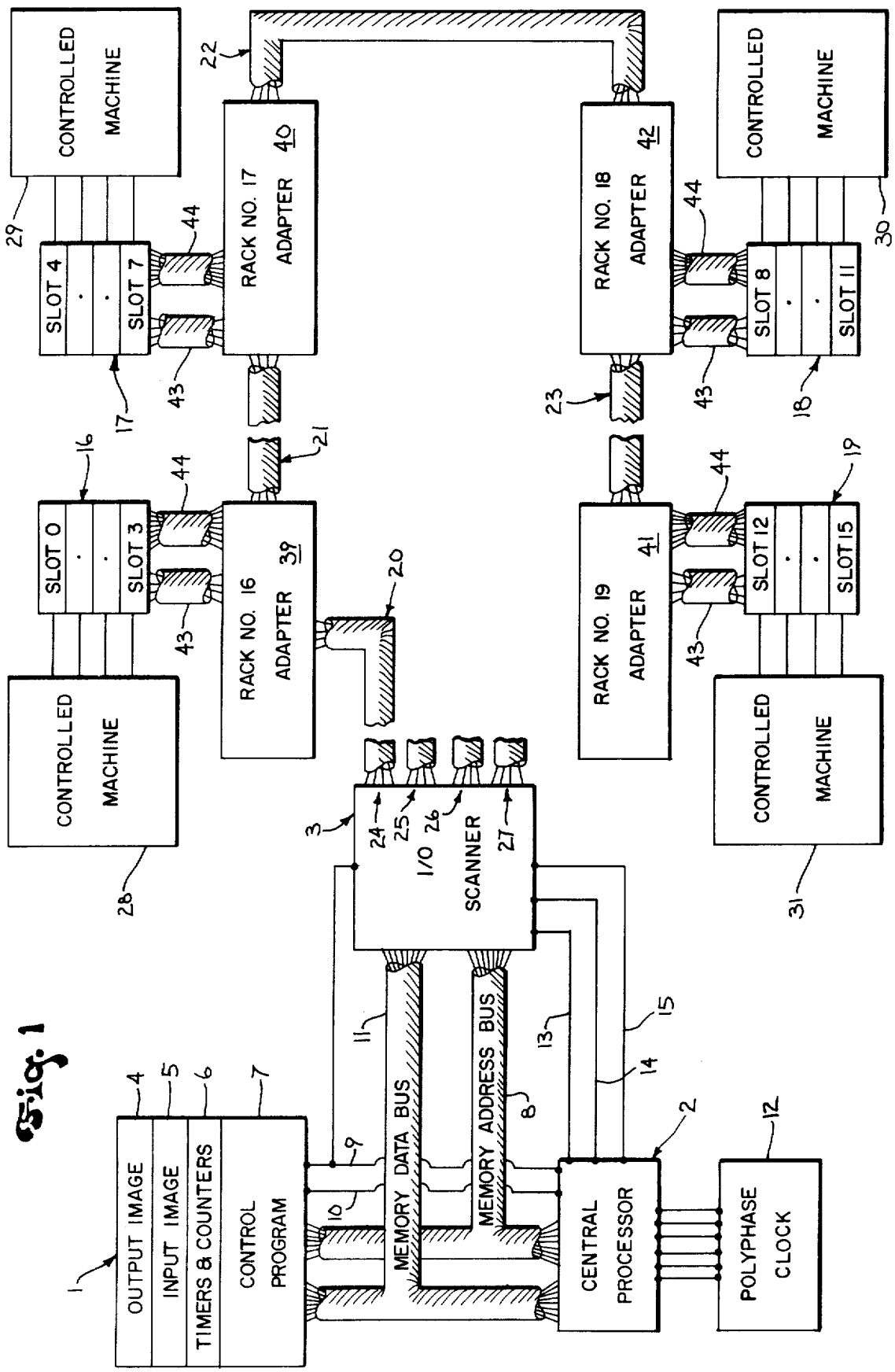
FIG. 1 is a block diagram of a programmable controller which includes a rack adapter that incorporates the present invention.

Referring to FIG. 1, a programmable controller which incorporates the present invention also includes a central memory 1, a central processor 2, and a remote I/O scanner circuit 3, which are located at a central processing station and coupled together for operation. This tripartite central processor means in the programmable controller is the same as that disclosed in Markley et al, U.S. Pat. No. 3,997,879, mentioned above.

The central memory 1 is a random-access read/write memory which stores words of eighteen bits each in 4,096 to 12,288 separately addressable lines depending on the size of the control program which is stored. Two bits of each word are used for parity checking and sixteen bits of each word are data bits. An output image table 4 is stored on the first 64 lines of the central memory 1 and is addressable with the octal addresses 000–077. An input image table 5 is stored on the next 64 lines of the central memory 1 and is addressable with the octal addresses 100–177. Preset and accumulated values of counters and timers are stored in a contiguous area 6 of the central memory 1, which has 128 lines or 384 lines or 896 lines that are addressable with the octal addresses 200–377 or 200–777 or 200–1777. The remaining area 7 of the control memory 1 contains a control program in which program instructions are addressable with octal addresses 400 or 1000 or 2000 or greater.

Selected data is read from the central memory 1 by applying the binary equivalent of the octal address of the line containing the data to a memory address bus 8, by applying a logic low voltage to a read/write line 9, and by applying a logic high voltage to the memory cycle line 10. Selected data is written into a selected line of the central memory 1 by applying the address of that line to the memory address bus 8, by applying a logic high voltage to the read/write line 9, and by applying a logic high voltage to the memory cycle line 10. The 16-bit data word appearing on the memory data bus 11 during a one-microsecond cycle time is written into the selected line of the central memory 1.

The control program is executed by the central processor 2 which is connected to the memory buses 8, 11 and to the control lines 9, 10. In response to clock pulses generated at a frequency of one megahertz by a polyphase clock 12 connected to it, the central processor 2 continuously and sequentially reads instructions of the control program from its program storage area 7 in the central memory 1. The central processor 2 decodes an operation code in each program instruction to carry out various control operations. One control operation is the examination of status bits in the input image table 5. Each of the status bits corresponds to a sensing device on a controlled machine such as a limit switch or a photoelectric cell. Another control operation is the setting of status bits in the output image table 4. Each of these status bits corresponds to a control device on the machine such as a motor starter or a solenoid. Output status bits are set according to the status of bits in the input image table 5 and the particular logical processing instructions contained in the control program. Further information on the operation of the central processor 2, the central memory 1, and the polyphase clock 12 is disclosed in Dummermuth, U.S. Pat. No. 3,942,158, issued Mar. 2, 1976, and entitled "Programmable Logic Controller."

The I/O scanner circuit 3 is connected to the central processor 2 and to the central memory 1 through the memory address bus 8, the memory data bus 11, and the read/write line 9. It is also connected to the central processor 2 through an interrupt request line 13, a grant line 14, and a disable line 15. The I/O scanner circuit 3 periodically steals a memory cycle from the central processor 2. During this memory cycle the I/O scanner circuit 3 either writes a 16-bit data word into the input image table 5, or reads a 16-bit data word from the output image table 4.

The I/O scanner circuit 3 couples data between the image tables 4, 5 in the central memory 1 and four remotely located I/O interface racks 16–19 shown in FIG. 1. In U.S. Pat. No. 3,997,879, mentioned above, the prior I/O scanner circuit is connected to four I/O interface racks through four separate, shielded cables, each having four conductors. With this arrangement the I/O interface racks can be located up to 5,000 feet away from the central processing station. In FIG. 1 of the drawings herein, the four I/O interface racks 16–19 are connected by cables 20–23 of the same kind, but the I/O interface racks 16–19 are connected in series along a single communication channel 24 rather than in parallel. This communication channel 24 extends from the I/O scanner circuit 3 to the most remotely located interface rack 19, which can be located up to 10,000 feet from the central processing station. Three other communication channels 25–27 also extend from the I/O scanner circuit 3, and up to four separate I/O interface racks can be connected in series along each of these channels 25–27 to provide a maximum capacity of sixteen I/O interface racks in the controller. The I/O interface racks 16–19 are distributed so that each rack is positioned alongside a respective one of a corresponding number of controlled machines 28–31.

The interface racks 16–19 each contain four I/O modules, which are physically inserted in slots in their respective racks 16–19. The I/O modules are printed circuit boards having either eight input circuits (i.e., an input module) or eight output circuits (i.e., an output module). The output circuits, such as those disclosed in Struger et al, U.S. Pat. No. 3,745,546, issued July 10, 1973, are each connected to drive operating devices on an associated controlled machine 28–31, while the input circuits, such as those disclosed in Kiffmeyer, U.S. Pat. No. 3,643,115, issued Feb. 15, 1972, are each connected to sensing devices on an associated controlled machine 28–31. Thus, the I/O interface racks 16–19 have the capacity to monitor and control 128 separate devices on an associated controlled machine 28–31. Word-oriented I/O modules for controlling analog devices such as those described in Grudowski et al, U.S. Pat. No. 4,104,731, issued Aug. 1, 1978, can also be employed in the I/O racks 16–19.

Figure 2:
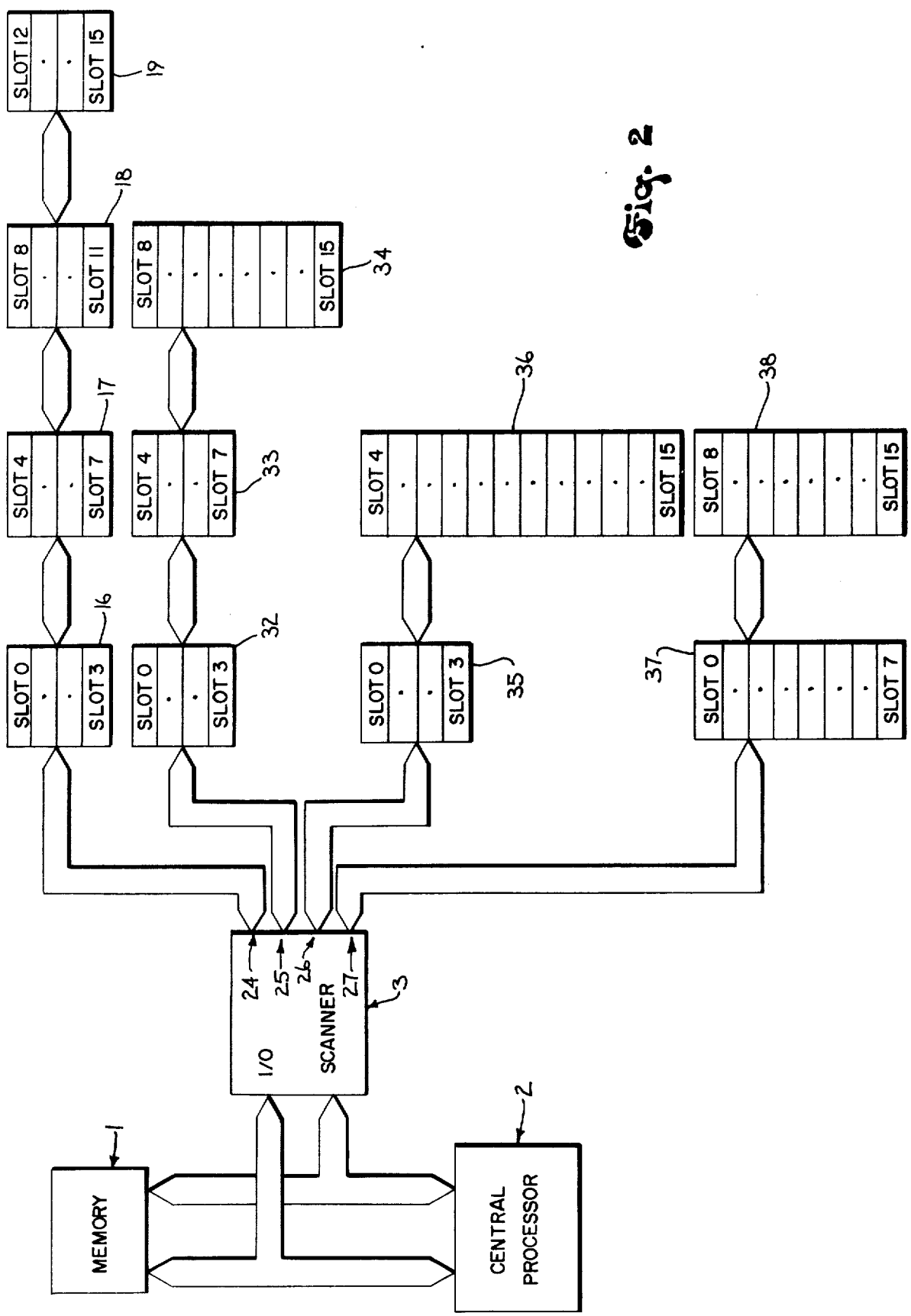
FIG. 2 is a block diagram of the programmable controller of FIG. 1 with I/O interface racks connected in four communication channels.

For convenience of illustration in FIG. 1, the communication channel 24 loops back toward the central processing station, however, it should be understood that in many situations the I/O interface racks 16–19 are located at successively greater distances from the central processing station. In FIG. 2 an arrangement is shown wherein I/O interface racks 16–19 and 32–38 are distributed in all four of the communication channels 24–27 that extend from the I/O scanner 3.

Whereas, in U.S. Pat. No. 3,997,879, mentioned above, the I/O interface racks have sixteen slots, the present invention contemplates the use of a number of interface racks of smaller capacity in one or more of the serial communication channels 25–27. The rack slots from the racks in each communication channel are grouped together for addressing purposes, so they shall be identified by consecutive numbers "0–15." The central processor 2, through the I/O scanner circuit 3, scans sixteen I/O slots in each communication channel 24–27, irrespective of the division of these slots among the interface racks in the channels 24–27. Thus, for example, in FIGS. 1 and 2, in the first communication channel 24, slots "0–3" are located in the first rack 16; slots "4–7" are located in the second rack 17; slots "8–11" are located in the third rack 18; and slots "12–15" are located in the fourth rack 19. As exemplified in FIG. 2, other combinations are possible, or if desired, a rack with up to sixteen I/O modules can be connected to any of the communication channels 24–27 in place of a serial group.

The present invention resides in the rack adapters 39–42 which are each physically mounted in a respective I/O interface rack 16–19 in FIG. 1, and which are each connected to the I/O modules in its respective rack 16–19 through a slot address bus 43 and an I/O data bus 44. Communication between the I/O scanner circuit 3 and the rack adapters 39–42 is accomplished by sending and receiving data bits serially through the transmission cables 20–23. Data in the output image table 4, which is stored in 16-bit words, is first divided into two eight-bit words or bytes, and is then converted to serial data that is transmitted from the I/O scanner circuit 3 to the I/O interface racks 16–19. The rack adapters 39-42 receive the serial data and couple bytes of "parallel" output data to the I/O modules in its own I/O interface rack. Input data is also received from each I/O module and is converted from bytes of parallel data to eight bits of serial data by the rack adapters 39-42. This serial data is then transmitted to the I/O scanner circuit 3, which assembles the data into 16-bit words for storage in the input image table 5.

Figure 3:
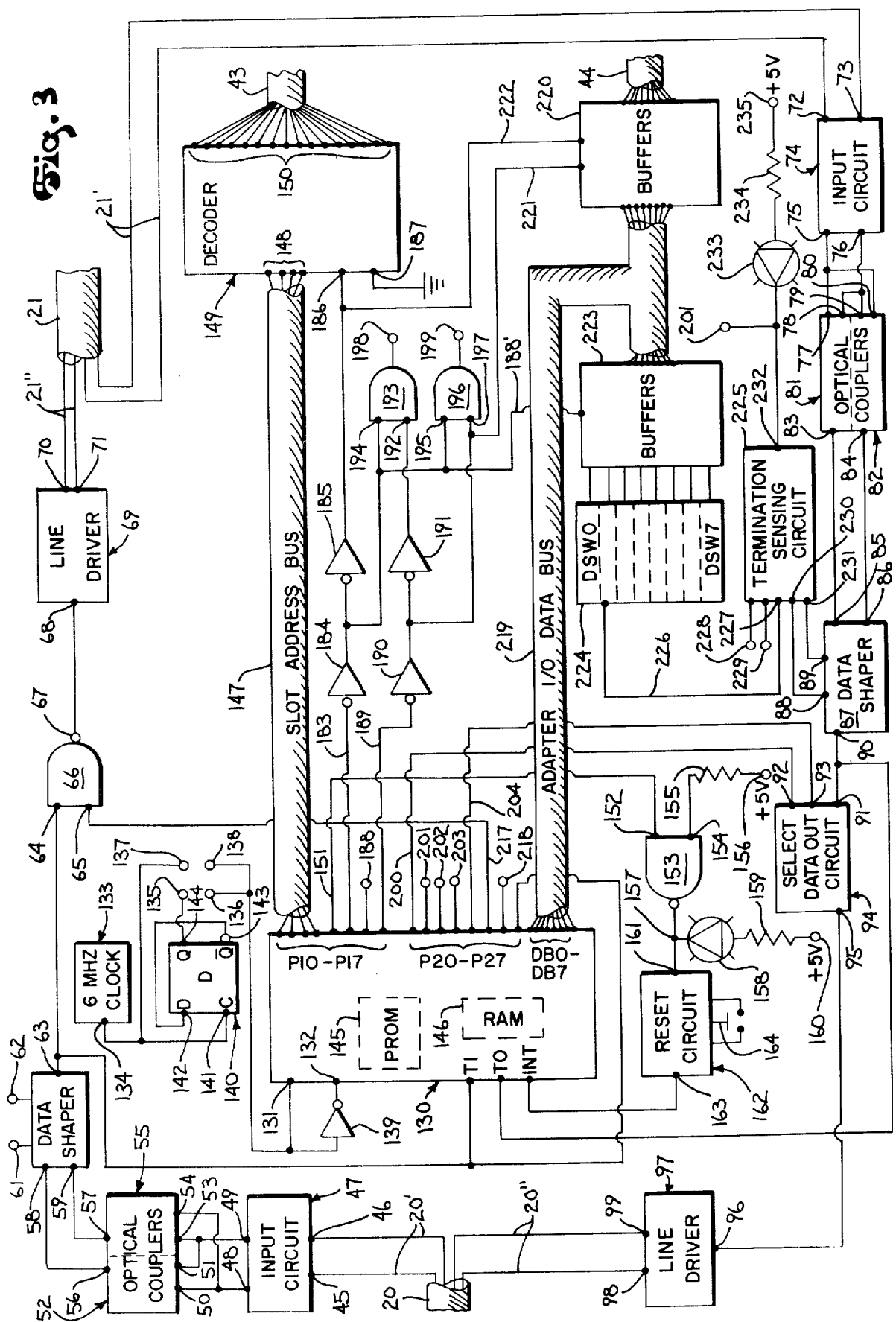
FIG. 3 is a combination electrical schematic and block diagram of one of the rack adapter circuits of FIG. 1, each of which incorporates the present invention.

The connection of the rack adapters 39-42 in the communication channel 24 is shown more particularly in FIG. 3, where two conductors in the first transmission cable 20 form an input line 20' coming to the first rack adapter 39 from the I/O scanner circuit 3, and the other two conductors in that transmission cable 20 form an output line 20" going to the I/O scanner circuit 3 from the first rack adapter 39. Similarly, two conductors in the second transmission cable 21 form an input line 21' coming to the first rack adapter 39 from the second rack adapter 40, and the other two conductors in the second transmission cable 21 form an output line 21" going to the second rack adapter 40 from the first rack adapter 39.

The serial data on input line 20' coming from the central processing station is amplified, filtered and shaped before being applied to the rack adapter circuitry. More specifically, the input line 20' is connected to a pair of inputs 45, 46 on a first input circuit 47. The first input circuit 47 in turn has a pair of outputs 48 and 49 that are connected to the inputs 50 and 51 on an optical coupling circuit 52 and to the inputs 53 and 54 on another optical coupling circuit 55. Outputs 56 and 57 on the respective coupling circuits 52 and 55 are connected to a pair of inputs 58 and 59 on a first data shaper circuit 60. The data shaper circuit 60 has a pair of tap terminals 61 and 62 the connection of which will be explained further below. The data shaper circuit 60 also has a single output 63 that is connected to the first of two inputs 64 and 65 on a receiving line NAND gate 66. The NAND gate 66 has an output 67 connected to an input 68 on a first driver circuit 69 and the line driver 69 has a pair of outputs 70 and 71 that are connected to the conductors of the output line 21" going to the second rack adapter 40.

Similarly, the input line 21' coming from the second rack adapter 40 is connected to a pair of inputs 72 and 73 on a second input circuit 74. The second input circuit 74 has a pair of outputs 75 and 76 that are connected to four inputs 77-80 on a second pair of optical coupling circuits 81 and 82, in the same manner as described above for the first input circuit 47 and the first pair of optical coupling circuits 52 and 55. The second pair of optical coupling circuits 81 and 82 have a pair of outputs 83 and 84, respectively, that are connected to a pair of inputs 85 and 86, respectively, on a second data shaper circuit 87. This data shaper circuit 87 also has a pair of tap terminals 88 and 89, and it also has an output 90 which is connected to the first of three input terminals 91-93 on a select data out circuit 94. The select data out circuit 94 has an output 95 connected to an input 96 on a second line driver circuit 97. The second line driver circuit 97 has a pair of outputs 98 and 99 that are connected to the output line 20" going back to the I/O scanner circuit 3.

This receiving and transmitting circuitry performs several functions. Input circuits 47 and 74 limit current and allow for the receiving of serial data at two different bit transmission rates. The optical coupling circuits 52, 55, 81 and 82 are standard coupling circuits which are listed in Appendix B, and which provide optical isolation between the input lines 20', 21' and the communication interface circuitry to be described below. The data shaper circuits 60 and 87 each have a data latch as a primary component which shapes the bit pulses and further immunizes the rack adapter circuitry from electrical noise in the transmission cables 20 and 21. The line driver circuits 69 and 97 are standard circuits for amplifying data bit pulses that are transmitted serially through transmission lines.

Figure 4:
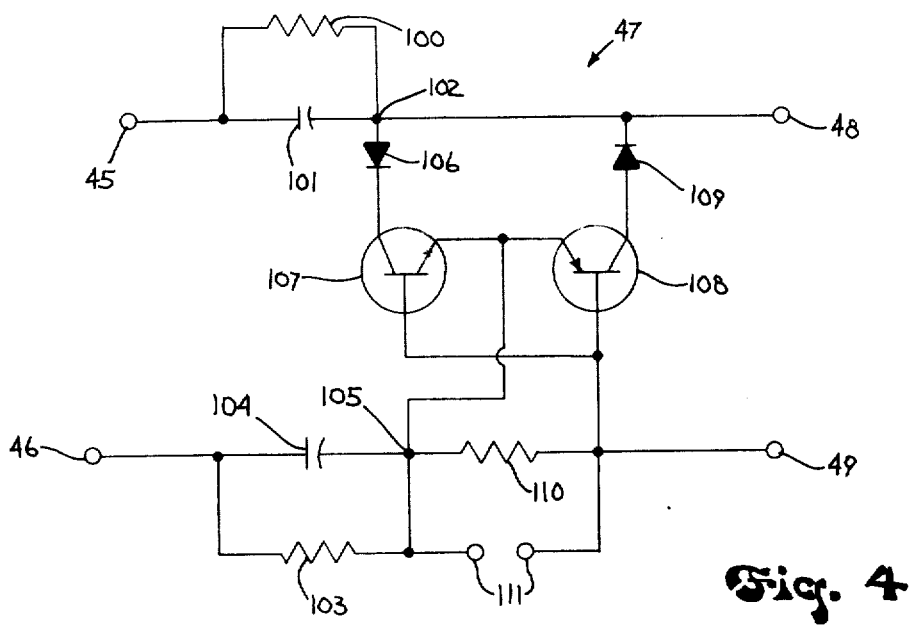
FIG. 4 is an electrical schematic diagram of an input circuit which forms a part of the rack adapter circuit of FIG. 3.

As seen more particularly in FIG. 4, the first input circuit 47, which is like the second input circuit 74, has a first current-limiting resistor 100 and a first capacitor 101 connected in parallel between the first input 45 and a first intermediate junction point 102. The input circuit 47 also has a second current-limiting resistor 103 and a second capacitor 104 connected in parallel between the second input 46 and a second intermediate junction point 105. A first diode 106 has an anode connected to the first junction 102 and a cathode connected to a collector of an NPN transistor 107. The emitter of this NPN transistor 107 is connected to an emitter of a PNP transistor 108, and to the second junction 105. The PNP transistor 108 has its collector connected to the anode of a second diode 109, which has its cathode connected to the first output 48. The first junction point 102 is also directly connected to the anode of the second diode 109 and to the first output 48 to provide an alternate current path. A biasing resistor 110 is connected between the second junction 105 and a triple connection to the second output 49 and to the bases of the two transistors 107 and 108. A pair of shorting terminals 111 are connected to opposite sides of the biasing resistor 110.

The input circuit 47 in FIG. 4 is shown for operation with a 12,500 bits/second transmission rate, where the length of the communication channels 24-27 may extend to 10,000 feet. In this circuit a current flows through the biasing resistor 110 to cause both transistors 107 and 108 to conduct. To convert the circuit for operation at a 25,000 bit/second rate, the shorting terminals 111 are connected to short the base/emitter junctions of both transistors 107 and 108 and to prevent them from conducting any appreciable current. The capacitors 101 and 104 are open circuited or removed from the input circuit 47 leaving only the current-limiting resistors 100 and 103 in series with the incoming line 20'.

Figure 5:
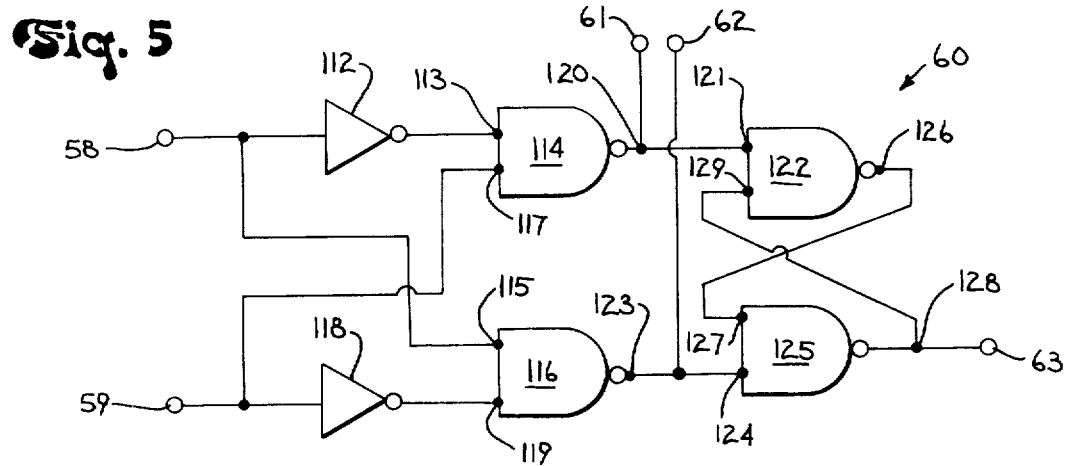
FIG. 5 is an electrical schematic diagram of a data shaper circuit which forms part of the rack adapter circuit of FIG. 3.

The first data shaper circuit 60, which is like the second data shaper circuit 87, is seen in more detail in FIG. 5. The first input 58 is connected through an inverter 112 to a first input 113 on a first NAND gate 114, and is also directly connected to a first input 115 on a second NAND gate 116. The second input 59 is directly connected to a second input 117 on the first NAND gate 114, and is also connected through an inverter 118 to a second input 119 on the second NAND gate 116. An output 120 on the first NAND gate 114 is connected to a first input 121 on a third NAND gate 122 and an output 123 on the second NAND gate 116 is connected to a second input 124 on a fourth NAND gate 125. The tap terminals 61 and 62 are taken from the outputs of the first and second NAND gates 114 and 116. An output 126 on the third NAND gate 122 is connected to a first input 127 on the fourth NAND gate 125, and an output 128 on the fourth NAND gate 125 is connected to a second input 129 on the third NAND gate 122 to form a data latch that is connected to the output 63 of the data shaper circuit 60.

The data shaper circuit 60 gates a data bit from its input terminals 58 and 59 to the data latch NAND gates 122 and 125, where the bit is held until the next data bit is received. The latched data bit is then sent out through the output terminal 63. The transmission of bit pulses through the data shaper circuit 60 reestabishes the waveform shape of the bit pulse to counteract the effects of noise and distortion in the input line 20'. The second data shaper circuit 87 operates in the same manner for data bit pulses received on the input line 21' coming from the second rack adapter 33.

Referring again to FIG. 3, the output terminal 63 of the first data shaper circuit 60 is also connected to a T1 input on a rack interface processor 130. Data bits coming to the rack adapter 39 are received by the rack interface processor 130 at the T1 input, and are also coupled to the second transmission cable 21 through the receiving line NAND gate 66. The rack interface processor 130 includes the processing, control and other portions, except memory, of an Intel 8048 Microcomputer manufactured by the Intel Corporation, Santa Clara, California. The internal structure and operation of this microcomputer is described in the MCS-48 ® Microcomputers Users Manual, which was published by the Intel Corporation in 1976. Some of the information contained in this manual is repeated herein, however, the manual should be consulted for full details on the use and operation of this microcomputer. In the present invention, the rack interface processor 130 controls the flow of data between the central processing station and the I/O modules in the first I/O interface rack 16, and also controls the transmission of data between the other racks 17–19 and the central processing station.

The rack interface processor 130 also has a T0 input, an INT input, and positive and negative clock inputs 131 and 132. The T0 input is connected to the output terminal 90 of the second data shaper circuit 94 to monitor data coming from the next rack adapter 40 through the input line 21'. The INT input controls the resetting of the rack interface processor 130, which will be explained more fully below. A six-megahertz external clock 133 has an output 134 connected to the two processor clock inputs 131 and 132 through alternate pairs of jumper terminals 135–136 and 137–138. An inverter 139 is connected in the line going to the negative clock input 132. A D-type flip-flop 140 has a clock input 141 connected to the output 134 of the external clock 133 and a D input 142 connected to a $\overline{Q}$ output 143. A Q output 144 of this flip-flop 140 is connected to a terminal 135 from the first pair of jumper terminals 135 and 136.

The connection of the D-type flip-flop 140 in the clock circuit provides for alternate timing signals for the rack interface processor 130 so that it can be adjusted to receive and transmit data at either of two bit transmission rates. The six-megahertz clock frequency is divided by three, by a state counter (not shown) in the rack interface processor 130, to obtain a frequency of two megahertz at a cycle time of 0.5 microseconds. A five-cycle counter (not shown) in the rack interface processor 130 counts five of these cycles to produce a 2.5 microsecond instruction period that is used by the rack interface processor 130, provided that the jumper terminals 137 and 138 are connected. If instead, however, the jumper terminals 135 and 136 are connected, and the jumper terminals 137 and 138 are not connected, a pulse is output from the Q output terminal 144 of the D-type flip-flop 140 for every two pulses that are input to its clock input terminal 141. This reduces the clock frequency received at the processor clock input terminals 131 and 132 to three megahertz and increases the instruction cycle to five microseconds. The six-megahertz timing signal is used in conjunction with the 25,000 bits/second transmission rate, while the three-megahertz timing signal is used in conjunction with the 12,500 bits/second transmission rate.

The rack interface processor 130 is coupled to an on-board programmable read-only memory (PROM) 145, which is another portion of the Intel 8048 microcomputer. The PROM 145 has a storage capacity of 1,000 eight-bit words or bytes and is mask programmable. The rack interface processor 130 is also coupled to an on-board random-access memory (RAM) 146, which is included in the Intel 8048 microcomputer. The random-access memory (RAM) 146 is arranged as sixty-four eight-bit registers. These registers provide a means for storing data during the execution of the control program, which is stored in the PROM 145. During execution of the control program, data is coupled between an accumulator (not shown) and certain registers in the RAM 146 called working registers. In addition data is coupled between the accumulator and three input/output ports P1, P2 and DB on the rack processor 130. Microprocessors with external program memories can, of course, also be used as the rack interface processor 130. For details of the internal coupling of the PROM 145 and the RAM 146 to the processing and control portions of the Intel 8048 microcomputer, reference is made to the Users Manual cited above.

The first I/O port, P1, on the rack interface processor 130, has eight terminals P10-P17 through which eight data bits are input or output. The least significant terminals P10-P13 are connected through a four-line slot address bus 147 to four inputs 148 on a four-line-to-sixteen-line decoder 149. The decoder 149 has sixteen outputs 150 for connection to sixteen corresponding slots "0-15" in the I/O interface rack 16 to form the slot enable bus 43. In this embodiment, outputs 150 would be connected only to slots "0-3" in the first I/O interface rack 16. The four-bit code generated at output terminals P10-P13 causes one of the sixteen leads in the slot enable bus 43 to go low, thereby enabling one of the sixteen I/O modules in the I/O interface rack.

Terminal P14 on the rack processor 130 is connected through a rack fault line 151 to a first input 152 on a rack fault NAND gate 153. This NAND gate 153 has a second input 154 which is connected through a pull-up resistor 155 to a +5-volt voltage source 156. An output 157 on the rack fault NAND gate 153 is connected through a light-emitting diode (LED) 158 and a pull-up resistor 159 to a +5-volt voltage source 160. The output 157 of the rack fault NAND gate 153 is also connected to an input 161 on a reset circuit 162, and an output 163 on the reset circuit 162 is connected to the INT input on the rack interface processor 130. A reset pushbutton 164 is connected to the reset circuit 162. A logic high voltage signal on the rack fault line 151 indicates a rack fault and causes a logic low voltage signal at the output 163 of the NAND gate 153. This signal activates the rack fault LED 158, which is part of a rack fault status indicator.

Figure 8:
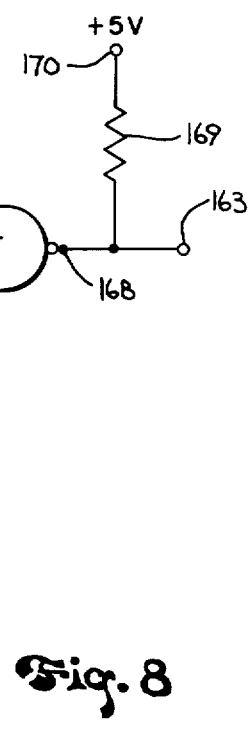
FIG. 8 is an electrical schematic diagram of a reset circuit which forms a part of the rack adapter circuit of FIG. 3.

The rack fault indication signal is also applied to the reset circuit 160 which is shown in more detail in FIG. 8. The input 161 on the reset circuit 162 is connected through an inverter 165 to a first input 166 on a reset NAND gate 167 of the open-collector type. An output 168 on this NAND gate 167 is connected through a pull-up resistor 169 to a +5-volt voltage source 170 and a second input 171 on the reset NAND gate 167 is connected to a collector of an NPN transistor 172. This collector is also connected through a pull-up resistor 173 to a +5-volt voltage source 174. The emitter of the NPN transistor 172 is connected to a circuit ground and the base of the NPN transistor 172 is connected through two resistors 175 and 176 to the anode of a diode 177. A biasing resistor 178 is also connected between the base of the NPN transistor 172 and ground to provide a bias voltage across the base-emitter junction of the NPN transistor 172. A grounded capacitor 179 is connected to the junction of the two resistors 175 and 176. Connected to the grounded plate of this capacitor 179 is a resistor 180 that is connected at its other end to one side of the pushbutton 164. The other side of the pushbutton 164 is connected to the cathode of the diode 177. The anode of the diode 177 is also connected through a pull-up resistor 181 to a +15-volt voltage source 182.

To reset the rack interface processor 130 following the detection of a rack fault, a logic low voltage signal is applied to its INT input terminal by the NAND gate 167. One input of the NAND gate 167 is held high by the rack fault signal at input 161 and the other input 171 is driven high when the pushbutton 164 is depressed and then released. When the reset pushbutton 164 is depressed, the capacitor 179 discharges through the resistor 176, the diode 177, the reset pushbutton 164 and resistor 180 to ground. The NPN transistor 172 is thus turned off and its collector is pulled high to enable the NAND gate 167. Once reset is accomplished the output 163 of the reset circuit 162 goes to a logic high voltage due to the release of the pushbutton 164.

Returning to FIG. 3, terminal P15 on the rack processor 130 is connected through a slot enable line 183 and a pair of inverters 184 and 185 to a strobe input terminal 186 on the four-line-to-sixteen-line decoder 149. A second strobe input terminal 187 on the decoder 149 is grounded. Terminal P16 is connected through an output strobe line 188 to the slots "0-3" in the I/O interface rack 16, and terminal P17 is connected through a read/write line 189 and a second pair of inverters 190 and 191 to a first input 192 on a read NAND gate 193. The output of the inverter 184 is connected to a second input 194 on the read NAND gate 193, and is also connected to a first input 195 on a write NAND gate 196. The output of the inverter 190 is connected to a second input 197 on the write NAND gate 196.

The read NAND gate 193 has an output 198, and the write NAND gate 196 has an output 199, which are connected to enable read and write operations for the slots "0-3" in the I/O interface rack 16. When a logic low voltage signal is output on the slot enable line 183 and an address is present on the slot address bus 147, one of the slots "0-3" is enabled. If a logic high voltage signal is output on the read/write line 189, a logic low voltage signal is present at the output 198 of the read NAND gate 193, and data is read from the addressed slot "0-3." During a read operation the output 199 of the write NAND gate 196 is at a logic high voltage. If, on the other hand, a logic low voltage signal is output on the read/write line 189, a logic low voltage signal is present at the output 199 of the write NAND gate 196, and data is written into the addressed slot "0-3" as signals are sent out on the output strobe line 188. During a write operation the output of the read NAND gate 193 is at a logic high voltage.

The rack interface processor 130 also has a second I/O port, P2, with eight terminals P20-P27 through which eight data bits are input or output. Terminal P20 is connected through a transmit data out line 200 to the second terminal 92 on the select data out circuit 94 and terminal P21 is connected to an "active" monitoring line 201. Terminal P22 is connected to an output reset line 202 that is connected to the I/O interface rack 16 to deenergize the I/O devices on the controlled machine by providing a logic high voltage reset pulse. Terminal P23 is connected to a module I/O line and terminal P24 is connected through a select data out line 204 to the third input 93 on the select data out circuit 94.

Figure 6:
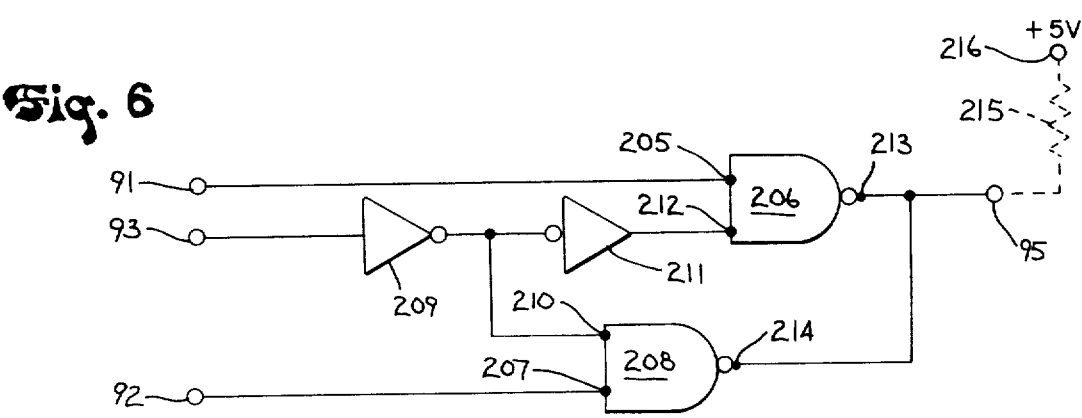
FIG. 6 is an electrical schematic diagram of a select data out circuit which forms part of the rack adapter circuit of FIG. 3.

The select data out circuit 94 selects either serial data coming from the next I/O interface rack to its first input 91, or serial data coming from its closely coupled I/O interface rack 16 to its second input 92, for transmission back to the central processor means through its third input 93, which is connected to the select data out line 204. As seen in more detail in FIG. 6, the first input 91 is connected to a first input 205 on a first NAND gate 206. The second input 92 is connected to a first input 207 on a second NAND gate 208. The third input 93 is connected through a first inverter 209 to a second input 210 on the second NAND gate 208, and through inverters 209 and 211 to a second input 212 on the first NAND gate 206. The outputs 213 and 214 of the first and second NAND gates 206 and 208, respectively, are connected together in a "wired OR" connection. The NAND gates 206 and 208 are open collector gates. A pull-up resistor 215 (shown in phantom), included in the second line driver circuit 97 (not shown in FIG. 6), is connected to a +5-volt voltage source 216. When one of the NAND gates 206 or 208 is enabled, it outputs a logic low voltage signal, while the other NAND gate output remains at a logic high voltage. When a logic low voltage pulse is output on the select data out line 204 to the third input terminal 93 on the select data out circuit 94, the second NAND gate 208 is enabled and data from the first I/O interface rack is sent back to the central processor 2. When a logic high signal is output on the select data out line 204, the first NAND gate 206 is enabled and data coming from one of the other I/O interface racks 17-19 is sent back to the I/O scanner circuit 3.

While the flow of data back to the central processor 2 is controlled by the select data out circuit 94, the flow of data to the I/O interface racks 16-19 is controlled through the receiving line NAND gate 66. Referring again to FIG. 3, terminal P25 of the rack interface processor 130 is connected through a received data out line 217 to the second input 65 on the receiving line NAND gate 66. When a logic high voltage is maintained on the received data out line 217, the receiving line NAND gate 66 is enabled. When a logic low voltage is maintained, the receiving line NAND gate 66 is disabled, which prevents data coming from the central processor 2 from being transmitted further to more remotely located I/O interface racks 17-19.

Terminal P26 of the rack interface processor 130 is connected to an input module sensing line 218. This line is connected to those I/O rack slots "0-3" on the first rack 16 to sense whether or not an input module is present. A logic high voltage signal received by the rack interface processor 130 through this line 218 indicates that an input module is present in the enabled slot "0-3," while a logic low voltage signal indicates the absence of an input module. Finally, terminal P27 is connected to the T1 input on the rack interface processor 130 to provide another input for receiving serial data bits coming from the I/O scanner circuit 3.

The respective functions of the terminals P10-P17 and P20-P27 in the first two I/O ports are summarized in Table 1 below for convenient reference. The I/O ports P1 and P2 are quasi-bidirectional ports in which input terminals and output terminals can be mixed. Single bits can be tested or output using certain program instructions as illustrated in Appendix A.

TABLE 1

| Port | Bit | I/O | Description | High (1) | Low (0) |
|---|---|---|---|---|---|
| 1 | 0 | O | $1_{10}$ ⎫ | 1 | 0 |
| 1 | 1 | O | $2_{10}$ ⎬ Slot Address | 1 | 0 |
| 1 | 2 | O | $4_{10}$ ⎪ | 1 | 0 |
| 1 | 3 | O | $8_{10}$ ⎭ | 1 | 0 |
| 1 | 4 | O | Rack fault indicator/reset pushbutton (PB) enable | On/PB inhibited | Off/PB enabled |
| 1 | 5 | O | I/O enable | Inhibited | Enabled |
| 1 | 6 | O | Output module strobe | Off | On |
| 1 | 7 | O | Read/write | Read | Write |
| 2 | 0 | O | Transmit data out | 1 | 0 |
| 2 | 1 | I | Active indicator | Active | Not active |
| 2 | 2 | O | Output reset | Reset | No reset |
| 2 | 3 | O | Mod ID line | Not Used | |
| 2 | 4 | O | Select data out | This rack | Another rack |
| 2 | 5 | O | Receiving line gate enable | Enabled | Inhibited |
| 2 | 6 | I | Input module present | Present | Not present |
| 2 | 7 | I | Receive data input | 1 | 0 |

Referring again to FIG. 3, a third I/O port DB on the rack interface processor 130 has its eight terminals DB0-DB7 connected to an eight-line adapter I/O data bus 219. This I/O port is a true bidirectional port, however, all of its terminals must operate simultaneously as either input terminals or output terminals, depending upon how the port is enabled. The adapter I/O data bus 219 is connected through a first set of buffers 220 to the rack I/O data bus 44 in the first I/O interface rack 16 to couple bytes of data between the I/O modules and the rack interface processor 130. When a slot "0-3" is addressed through the slot address bus 147, and when appropriate signals are transmitted on the read/write line 189, the first set of buffers 220 is enabled through a first enable line 221 and through a second I/O enable line 222 that is connected to the slot enable line 183. With the buffers 220 enabled, data is coupled between the I/O modules and the adapter I/O data bus 219.

The adapter I/O data bus 219 is also connected through a second set of buffers 223 to eight switches in a DIP switch circuit 224. The setting of certain DIP switches 224 signals the position of the I/O interface rack and the slots which are occupied by I/O modules. The rack interface processor 130 uses this information in setting up for communication with the central processor 2 and with the other I/O interface racks 17-19. The second set of buffers 223 is connected through the DIP switch enable line 188' to the output of the inverter 184. When a voltage pulse is applied to the slot enable line 183, the second set of buffers 223 is enabled and the status of the DIP switches 224 can be read into the rack processor port DB. The DIP switches are listed below with the last number in each switch label corresponding to a respective DB port terminal that each is connected to. Also listed are the type of information recorded by each respective switch and the status indicated by an "on" or "off" setting for each switch. switch.

TABLE 2

| Switch | Description | Off | On |
|---|---|---|---|
| DSW 0 | Not used (spare). | | |
| DSW 1 | Last rack indicator. | Last rack. | Not the last rack. |
| DSW 2 | Starting byte address, lower order. | $10_2$ | $00_2$ |
| DSW 3 | Starting byte address, higher order. | $100_2$ | $00_2$ |
| DSW 4 | Last state indicator. | Deenergize I/O devices. | Retain I/O devices in last state. |
| DWS 5 | Processor restart lockout. | Locked out. | Not locked out. |
| DSW 6 | Rack size, lower order. | $8_{10}$ | $4_{10}$ |
| DSW 7 | Rack size, higher order. | $8_{10}$ | 0 |

A termination sensing circuit 225 insures that the rack adapter 39 is properly connected in the communication channel 24. The last rack DIP switch DSW 1 is connected through a last rack line 226 to a single input 227 on the termination sensing circuit 225. The tap terminals 61 and 62 on the first data shaper circuit 60 are connected to a first pair of inputs 228 and 229 on the termination sensing circuit 225, and the tap terminals 88 and 89 on the second data shaper circuit 87 are connected to a second pair of inputs 230 and 231 on the termination sensing circuit 225. The output 232 of the termination sensing circuit 225 is connected through a light-emitting diode (LED) 233 and a resistor 234 to a +5-volt voltage source 235. The LED 233 is part of a status indicator that is illuminated when the output of the termination sensing circuit 225 is pulled low. This is an indication that the input lines 20', 21' are properly connected and that the last rack DIP switch DSW 1 is properly set. The active monitoring line 201 is also connected to the output 232 of the termination sensing circuit 225 to report this result to the rack interface processor 130.

Figure 7:
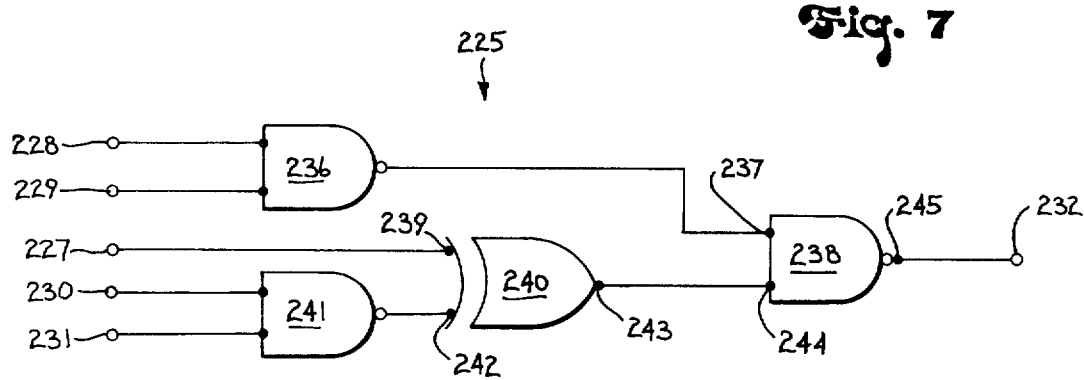
FIG. 7 is an electrical schematic diagram of a termination sensing logic circuit which forms part of the rack adapter circuit of FIG. 3.

As shown in more detail in FIG. 7 the first pair of inputs 228 and 229 on the termination sensing circuit 225 are connected through a first NAND gate 236 to a first input 237 on a second NAND gate 238. The single input 227 is connected to one input 239 on an exclusive OR gate 240, and the second pair of inputs 230 and 231 are connected through a third NAND gate 241 to another input 242 on the exclusive OR gate 240. An output 243 on the exclusive OR gate 240 drives a second input 244 on the second NAND gate 238, and an output 245 on the second NAND gate 238 drives the output 232 of the termination sensing circuit 225.

Unlike much of the circuitry described above, the termination sensing circuit is not controlled by the rack interface processor 130, but instead, directly senses the status of the two incoming transmission lines 20', 21'. The proper connection of the input line 20' coming from the I/O scanner circuit 3 produces logic low voltage signals at the inputs 228 and 229, which in turn produces a logic high voltage signal at the first input 237 of the second NAND gate 238. The exclusive OR gate 240 generates a second logic high voltage signal when the last rack line 226 is carrying a logic low voltage signal (signaling that another rack is connected to the input line 21') and a pair of logic low voltage signals are present at the inputs 230 and 231 of the third NAND gate 241 or, when the last rack line 226 is carrying a logic high voltage signal (signaling that this is the last rack), and a pair of logic high voltage signals are present at the inputs 230 and 231 to the third NAND gate 241. The lines in the data shaper circuits 60, 87 switch between high and low when the lines are properly connected, and the termination circuit output switches between high and low logic voltage levels at the frequency of the bit transmission rate, which results in the illumination of the LED 233.

Having described the circuitry in one of the rack adapters 39-42, the manner of communication between the central processor 2 and the rack adapters 39-42 shall now be described. Referring again to FIG. 1, the I/O scanner circuit 3 scans the I/O interface racks 16-19 in the first communication channel during a 10.08 millisecond period in which it interrupts the execution of the control program being executed by the central processor 2. This scan time is divided into eighteen byte transmission times. During the first sixteen byte transmission times input and output data bytes are transferred between the image tables 4, 5 in the central memory 1 and the I/O modules coupled through the rack adapters 39-42. During the seventeenth byte transmission time the rack adapters 39-42 each transmit a status byte through the communication channel 24 towards the I/O scanner circuit 3 to report any occurrence of errors in the transmission of data. The eighteenth byte transmission time is a delay period, sometimes referred to as a dwell period, which allows the rack adapters 39-42 to be resynchronized with the I/O scanner circuit 3. If I/O interface racks are connected to more than one of the communication channels 24-27, the byte transmission times are staggered for the respective channels to stagger the interruptions of the central processor 2.

Each of the eighteen transmission times is divided into fourteen bit transmission times. The present invention contemplates at least two different bit transmission rates: 25,000 bits/second and 12,500 bits/second. If a bit transmission rate of 25,000 bits/second is selected, each bit transmission time becomes forty microseconds. If the scanner I/O scanner circuit 3 and the rack adapters 39-42 are switched to operate with a bit transmission rate of 12,500 bits/second, then each bit transmission time will be eighty microseconds and the total scan time will be increased to 20.16 milliseconds. The lower bit transmission rate allows the extension of each of the communication channels 24-27 from 5,000 feet to 10,000 feet.

The rack interface processor 130 sequentially fetches program instructions stored in its PROM 145 and executes them to communicate with the central processor 2 and to couple data between the central processor 2 and the other I/O interface racks 17-19. The listing of these porgram instructions is contained in Appendix A and a definition and description of the individual instructions in this listing is provided in the Users Manual referred to above. It should be noted that the operation code mnemonics in the instruction set in Appendix A do not exactly coincide with those given in the Users Manual, however, the instructions in Appendix A can nevertheless be correlated with those in the Users Manual. The hexadecimal equivalent of each instruction is listed in the "Contents" column in Appendix A. The hexadecimal instruction codes are listed in the Users Manual and the hexadecimal codes can be converted to the binary codes given in the Users Manual to completely identify and correlate instructions from the two sets.

Figure 10:
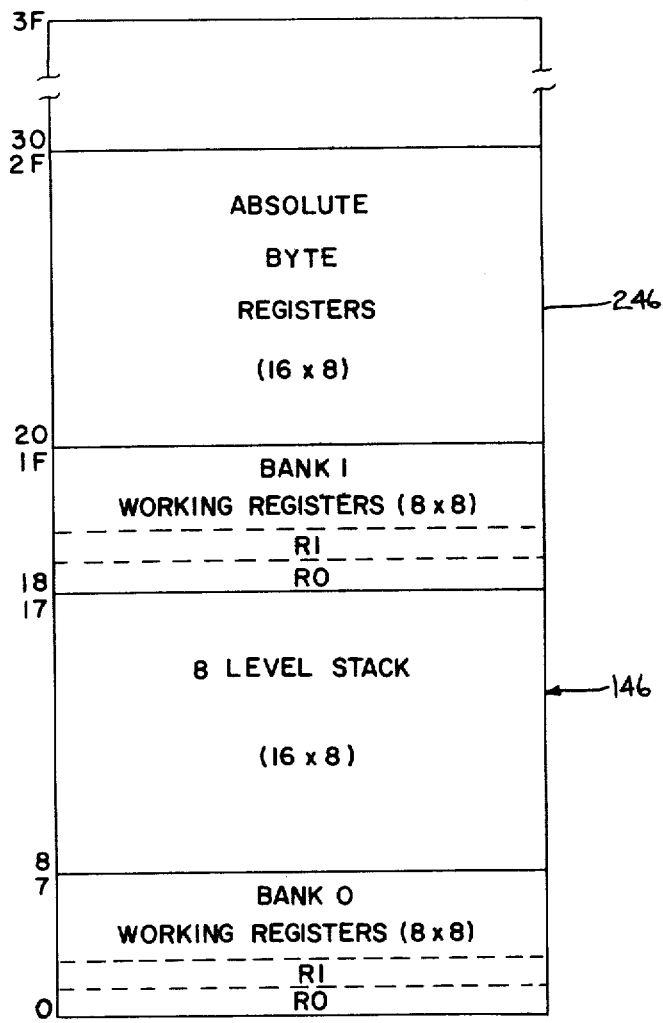
FIG. 10 is a memory map diagram of the on-board RAM memory which is coupled to the microprocessor and which forms a part of the rack adapter circuit of FIG. 3.

Many of the program instructions move data between the accumulator (not shown) and registers in the RAM 146. As seen in FIG. 10, the RAM 146 includes 64 eight-bit registers. The first eight of these registers are designated register bank B0, and another bank of working registers, referred to as register bank B1, includes registers at addresses 18-1F (hexadecimal). Between the two banks of registers, B0 and B1, there is an eight-level stack of register pairs, in which the program counter can be stored during subroutine calls. A stack pointer (not shown), which is coupled to this stack of registers, points to a register pair in the stack to store the program counter. The pointer advances to store succeeding return addresses in higher levels in the stack as successive subroutines are nested. Registers with addresses 20-2F (hexadecimal) are available in the remaining area of the RAM 146 to form an absolute byte storage area 246. In a particular program to be described, registers 20-2F are used to store information on the status of slots 0-15 in the I/O interface rack 16, whether or not the slots are all active, i.e., occupied by I/O modules. This status information is stored in "absolute bytes" of data in registers 20-2F of the absolute byte area 246.

A diagram of an absolute byte of data 247 is shown in FIG. 12. Bits "0-3" contain the slot address in binary form, i.e., 0000-1111. Bit "4" is set to a logic high level in two adjoining absolute data bytes when at least one slot in an adjoining pair of slots has an I/O module present. This is necessary to maintain the status of the eight-bit I/O modules in the image tables 4 and 5 of the central memory 1, which store data words that are sixteen bits wide. Bit "5" indicates the state of the select data out line 204 and determines whether data from this rack 16 or from the other I/O interface racks 17-19, is to be transmitted back to the central processor 2. A logic "0" selects data from this rack 16; a logic "1" selects data from one of the other racks 17-19. Bit "6" stores an error in transmission detected on a previous I/O scan, which is indicated by a logic "1." Bit "7" indicates that the slot address in bits "0-3" is in this rack when a logic "1" is present, and that the slot address in bits "0-3" is not in this rack when a logic "0" is present.

It is convenient to indirectly address the registers in the absolute byte area 246 through pointer registers B0R0 and B1R0 in the working register banks B0 and B1. The other registers in banks 0 and 1 are shown in FIG. 11. B0R0 is a pointer register that is used as an absolute byte counter which can be incremented or decremented as the registers in the absolute byte area 246 are sequentially addressed. Registers B0R2 maintains the status of I/0 port P2 and B0R3 is not used. B0R4 is a register which maintains the status of I/O port P1. B0R6 is a starting byte address register that maintains the address of the first active slot in the I/O interface rack 16, and B0R5 is an ending byte address register that maintains the address of the last active slot in the rack 17. Register B0R7 temporarily stores the status of the DIP switches DSW 0-DSW 7.

Of the other registers in bank 1, B1R1 is a pointer register which is set to point to register B0R4. Register B1R2 maintains data to be output through the second I/O port P2. Register B1R3 stores data to be transmitted back to the central processor 2, and register B1R4 stores data received from the central processor 2. Register B1R5 stores the parity of data in B1R3 as it is transmitted back to the central processor 2. Register B1R6 stores a serial data out mask, and B1R7 is a general purpose register.

Referring now to FIGS. 1, 3, 10 and 11, the rack interface processor 130, under program control, prepares for communication with the central processor 2 by loading initial values into its I/O ports P1 and P2. A logic high voltage signal is sent out through terminal P25 to enable the receiving line NAND gate 66. The rack interface processor 130 then examines slot "0" in its I/O interface rack 16 to determine whether an input I/O module is present. If an input module is present, data is read into register B1R3 in the RAM 146. Then, the rack interface processor 130 is synchronized with the central processor 2 by delaying until a start bit is received at its T1 input to begin the first byte transmission in the I/O scan.

After the start bit is received and several system checks, the byte transmission occurs with the rack interface processor 130 alternately sending and receiving each of eight I/O data bits. Eight data bits are transmitted from register B1R2 of the RAM 146 through the second I/O port P2, the transmit data out line 204, the select data out circuit 94 and the first output line 20". Eight data bits are received in register B1R4 of the RAM 146 through the first input line 20', the receiving circuitry, and the T1 input. Thus, in each byte transmission time, one byte of data is received from the central processor 2, and one byte of data is transmitted through the communication channel 24 towards the central processor 2.

During the I/O data bit transmission times, the rack adapters 39-42 in FIG. 1 receive data bits nearly simultaneously from the central processor 2, because the receiving line NAND gate 66 (see FIG. 3) in each rack adapter 39-42 is enabled. The transmission of I/O data bits back to the central processor 2 from the I/O interface racks 39-42 is controlled by the select data out circuit 94 (see FIG. 7) in each rack adapter 39-42, which in turn is controlled by the rack interface processor 130.

As the I/O data bits are transmitted and received, the parity of the transmitted data bits is maintained in register B1R5 of the RAM 146. After receipt of the eighth I/O data bit in each byte transmission time, a parity bit is transmitted from the P2 output register B1R2. A parity bit for the received I/O data byte is then received by the rack interface processor 130 from the central processor 2. The rack interface processor 130 then transmits a first stop bit before examining stop bits received from the central processor 2, and from adapters 40-42 in the other I/O interface racks 17-19, for transmission errors. The rack interface processor 130 does not, however, write the data received in register B1R4 into slot "0" of its I/O interface rack 16, until the data has been examined for errors.

The rack interface processor 130 checks data coming from both the central processor 2, and from other I/O interface racks 16-19 for two valid stop bits following the parity bit. A rack fault is indicated by two errors in the same I/O scan for the addressed slot, or two errors in successive I/O scans of the addressed slot. An error is indicated by a parity error or an invalid stop bit. If a single error is detected, the rack interface processor 130 stores this result in the corresponding register with address "20" in the absolute byte area 246 of the RAM 146. In this case, the data in register B1R4 is not written into the addressed slot "0." If a rack fault is detected, the rack interface processor 130 turns on the rack fault LED 158 and examines DIP switch DSW 4. According to the setting of the switch DSW 4 (see Table 2 above) the rack interface processor 130 either deenergizes the control devices on its associated controlled machine 28 or allows them to remain in their last state. The rack interface processor 130 then delays over a period sufficient to signal the I/O scanner circuit 3 that a fault has occurred. The reaction of the I/O scanner circuit 3 to a fault is explained in U.S. Pat. No. 3,997,879, cited above. The rack interface processor 130 then examines DIP switch DSW 5 and is locked out or not locked out from communicating with the I/O scanner circuit 3 according to the switch setting (see Table 2 above). When locked out, the rack interface processor 130 can be restarted by depressing the reset pushbutton 164.

If no transmission errors are detected during the byte transmission time, the rack interface processor 130 writes the received data in register B1R4 into the addressed slot and proceeds to the next byte transmission, to couple data between the I/O module in slot "1" to the central processor 2. At the end of sixteen byte transmissions, in which no fault has been detected, the rack interface processor 130 generates and transmits a status byte indicating a "no fault" condition to the central processor 2. The rack interface processor 130 then dwells for one transmission time, and then executes a set of instructions to prepare for the first byte transmission in the next I/O interrupt scan, which will commence when a start bit is received from the central processor 2.

Figure 9A:
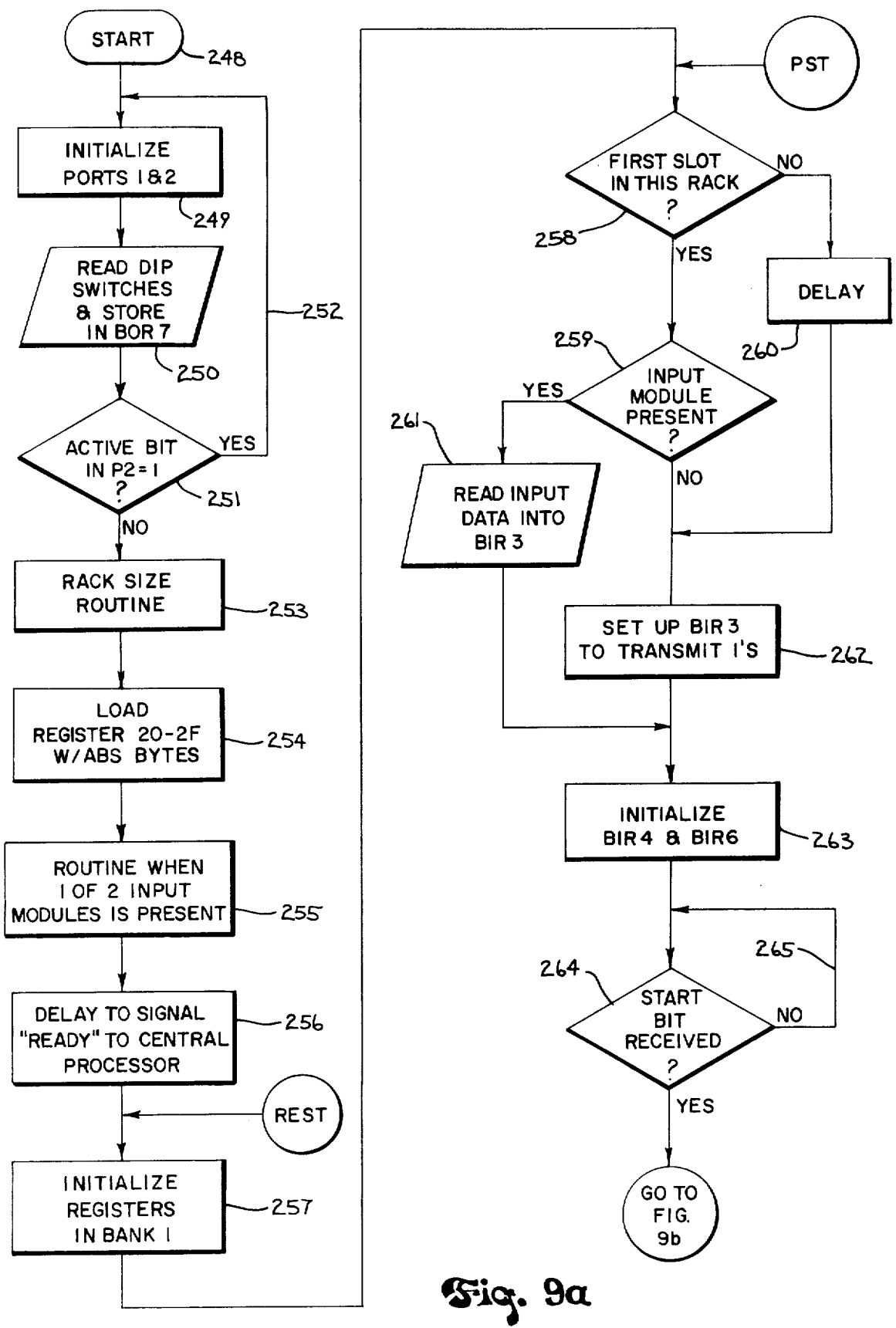
Figure 9B:
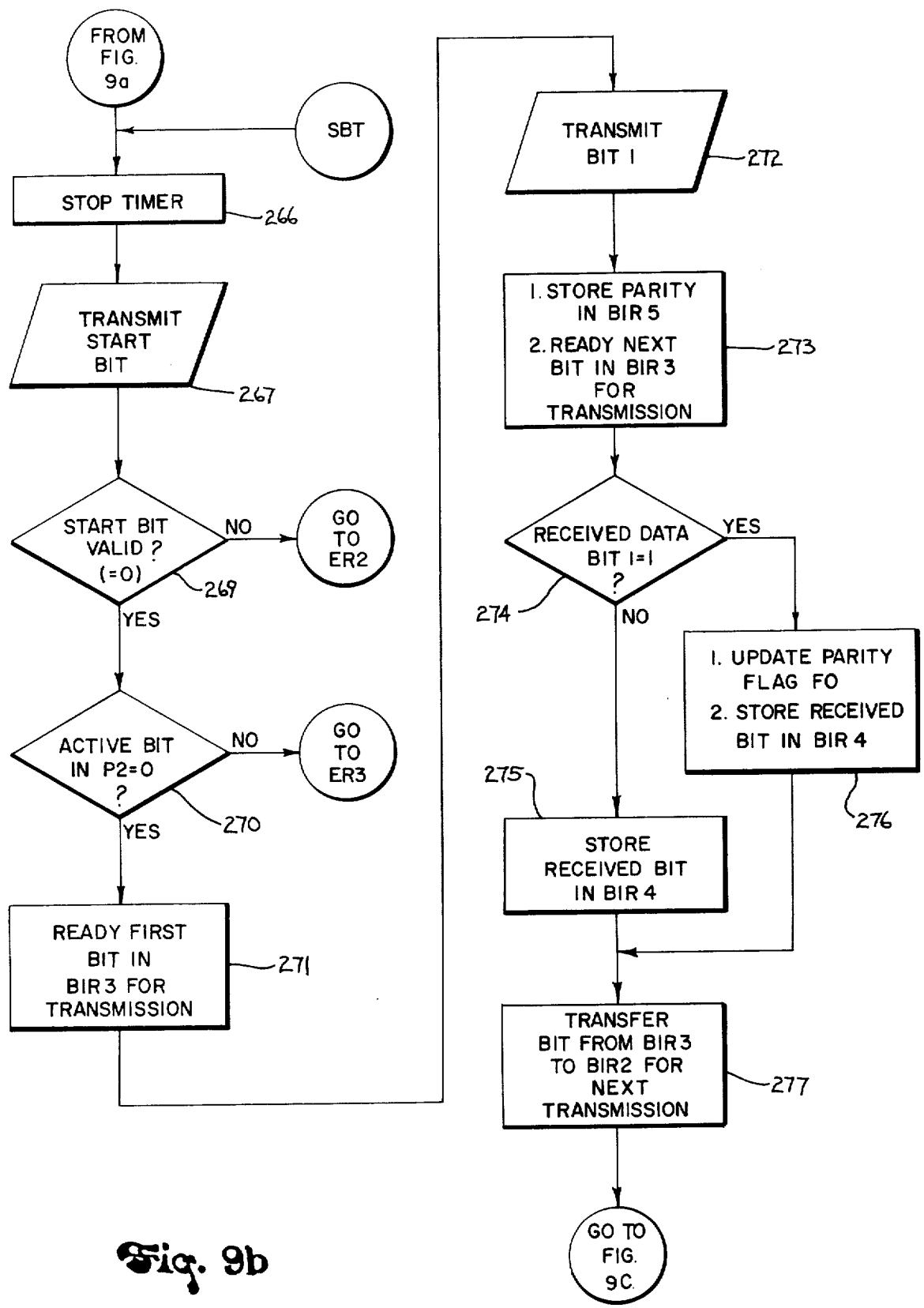
Figure 9C:
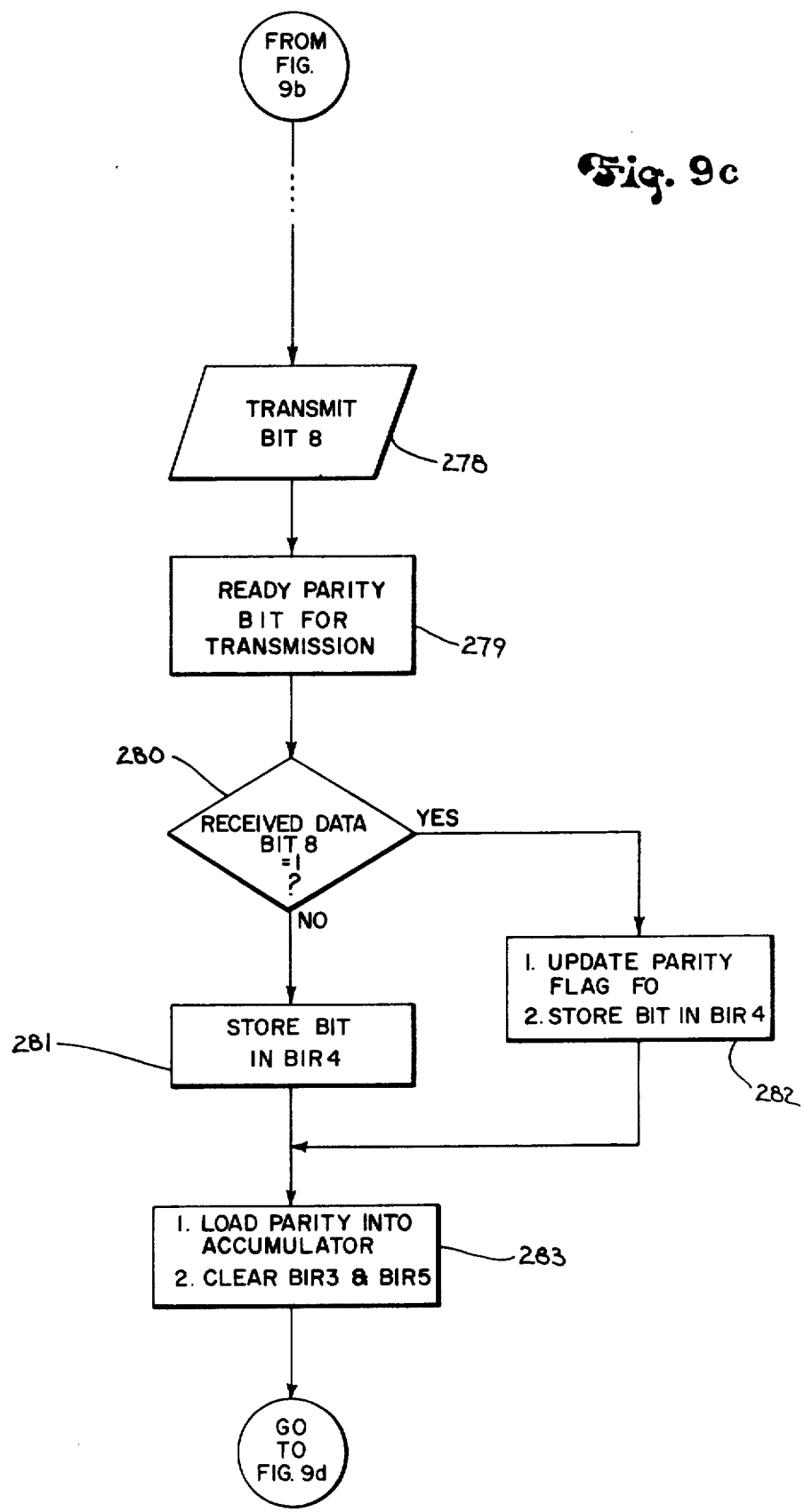
Figure 9D:
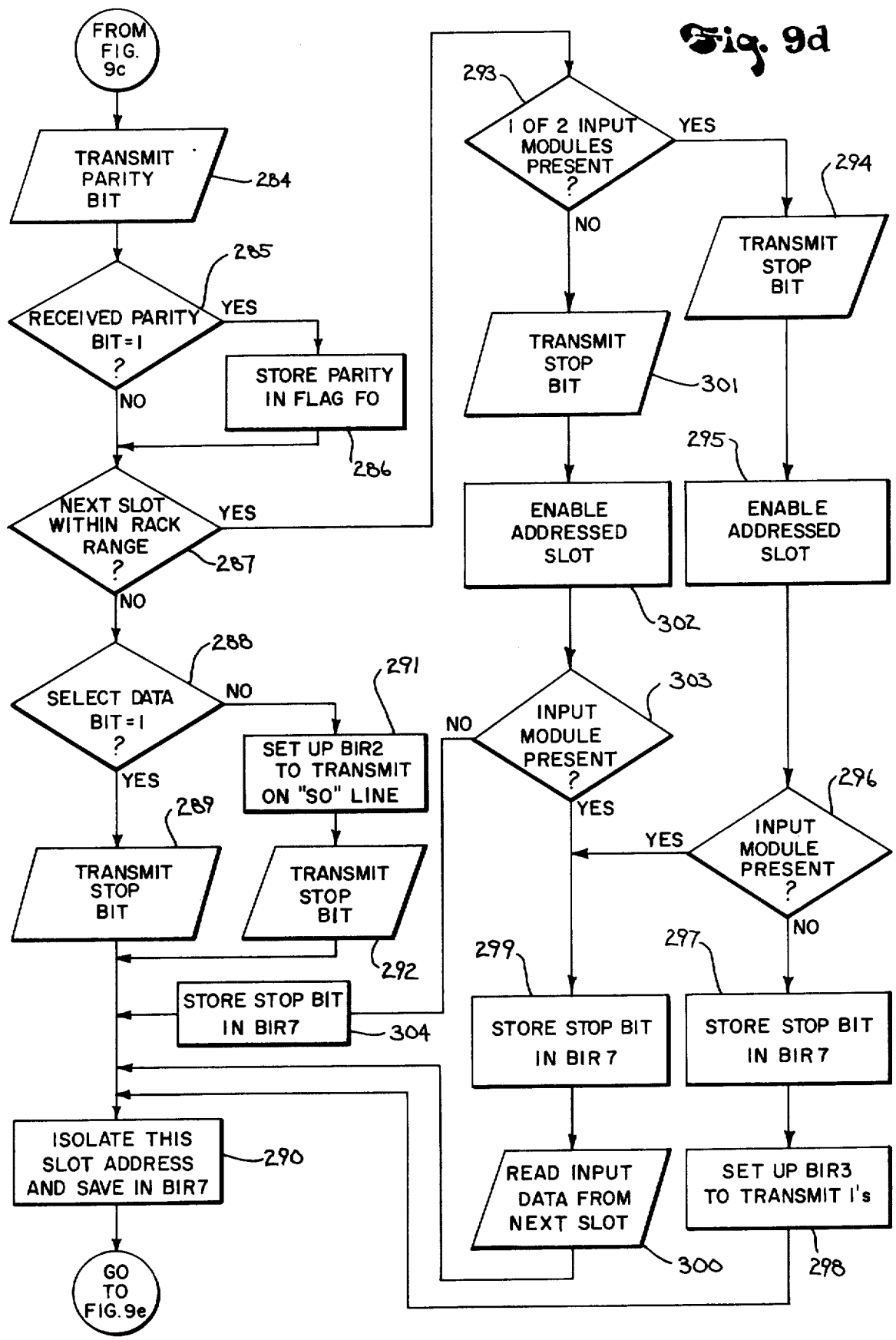

The program listed in Appendix A will now be described in more detail with reference to the flow charts 9a-9h and FIGS. 1, 3, 10 and 11. Referring to FIG. 9a, after the start of the program indicated in block 248, I/O ports P1 and P2 are initialized by a set of instructions indicated by process block 249. This initialization enables the receiving line NANE gate 66. The DIP switches DSW 0-DSW 7 are then read as indicated by I/O block 250, and their value is stored in register B0R7. Next, the active bit present at terminal P16 is tested as indicated by decision block 251. If a logic high is present, the rack adapter 39 is not active due to the improper termination of its input lines 20', 21', and the rack interface processor 130 remains in a program loop 252 until the condition is corrected. The rack fault indicating LED 158 is turned on for an instant at the beginning of the program, and if the rack processor 130 enters this program loop 252, the rack fault indicator stays on. If a logic low voltage is present at terminal P16, the program continues and the rack fault indicator is turned off.

A rack size routine is then executed as indicated by process block 253 and the number of occupied slots in the I/O interface rack 16 is determined from the information read from the DIP switches DSW 0–DSW 7. The rack size information is provided by DIP switches DSW 6 and DSW 7. The rack size information can also be provided via circuits on the I/O interface rack 16 itself, which are preselected according to rack size (for racks with 4, 8, 12 or 16 slots) and which are connected to terminals DB6 and DB7 through the buffers 223. As indicated by process block 254, the addresses of all the slots in the I/O interface rack 16 are written into registers 20–2F of the absolute byte area 246, and a binary "1" is written into bit "7" of the bytes with addresses corresponding to occupied slots in the I/O interface rack 16. Bytes corresponding to empty slots contain a binary "0" in bit "7."

Following this, a routine indicated by process block 255 is called up to set bit "4" in certain absolute byte registers 20–2F to prepare for transmissions when only one of two adjoining input modules is present. When this routine has been completed, the program enters a delay routine, indicated by process block 256, of 25.6 milliseconds which extends through the status byte transmission in two I/O scan times. This is a signal to the central processor 2 that the rack adapter 39 is ready to begin receiving and transmitting data.

The rack processor 130 then executes a REST portion of the program, indicated by process block 257, in which the registers in the second register bank, B1, are initialized. A PST portion of the program follows in which bit "7" of the absolute byte in register 20 is tested, as indicated by decision block 258, to determine whether the first slot is located in this I/O interface rack 16. For the controller shown in FIG. 1 the answer in the first rack adapter 39 will be in the affirmative, while the answer in the other rack adapters 40–42 will be negative. The rack interface processor 130 in the first rack adapter 39 then tests whether the I/O module in the first slot, "0" is an input module, as indicated in decision block 259, while the rack interface processors in the other rack adapters 40–42 call up a delay routine 260. If an input module is present in the first I/O interface rack 16, a read operation is performed, as indicated by I/O block 261 to read the input data into register B1R3. If an input module is not present or if no I/O module is present, as in the case of the other rack adapters 40–42, register B1R3 is loaded with zeros in all eight bits, as indicated by process block 262, so that all ones are transmitted when no input module is present. A "1" transmitted on the select data out line 204 will enable serial data coming through input line 21' from the other I/O interface racks 17–19 to be coupled to the output line 20" going towards the central processor 2. After this, a short process block of instructions 263 is executed to prepare the received data register B1R4 and to load the select data out mask into register B1R6. A test instruction in decision block 264 generates a single instruction program loop 265, where the rack interface processor 130 remains until a start bit is received.

The rack interface processor 130 then executes the main portion of the control program for each byte transmission time, which consists of a start bit time, eight data bit times, a parity bit time and four stop bit times. Each bit transmission time is 40 microseconds. At the 25,000 bits/second serial data rate a single-cycle program instruction requires 2.5 microseconds for execution. Therefore, this part of the program limits the number of machine instructions to execute the receipt and transmission of a single bit to sixteen single-cycle machine instructions or less.

During each byte transmission the rack interface processor 130, under program control, checks for faults in the transmission. One type of fault is a complete loss of data transmission. This type of fault can be tested by starting a timer at one point in the program and exiting to a fault routine ER1 unless a certain instruction in the program is reached to stop the timer. If the program is being executed in normal fashion, this instruction will be reached. If the timer times out the interrupt portion of the main program is ended, and the program is restarted at block 248. Another type of fault is indicated when a logic high signal is received on the active monitoring line 201, to indicate that the rack adapter 39 is not active. The active status of the rack adapter 39 is checked during the status byte transmission as well as during the sixteen data byte transmission times. Another type of fault occurs when the start bit that is received is not a valid start bit but an erroneous transmission pulse. A fault is also indicated when two consecutive logic low stop bits are received from the central processor 2. A fault is also indicated when a single low stop bit is received from the central processor 2, and an error has been recorded in the previous I/O scan for the same addressed I/O slot. Still another source of a fault is two low stop bits received at the T0 monitoring input, which is connected to monitor data received through the input line 21' coming from the next rack adapter 40.

Referring now to FIG. 9b, and FIGS. 1, 3, 10 and 11, the start bit transmission portion of the program, SBT, begins with an instruction in block 266 to stop the transmission loss timer, which is started near the end of each I/O scan during the dwell transmission time. After a transmit start bit instruction in an I/O process block 267 is executed, the received start bit is checked to determine if it is a valid start bit as indicated in decision block 269. If the received start bit is not valid, the rack interface processor 130 exits to a fault routine ER2. If the received start bit is valid, the rack interface processor 130 determines, as indicated by another decision block 270, whether the rack adapter module is active, i.e., properly connected to the input lines 20', 21'. If the rack adapter module is not active, the rack interface processor 130 exits to another fault routine ER3. Otherwise the rack interface processor 130 continues, as indicated by process block 271, where the first data bit is readied in register B1R2 for output through the second port P2.

The first data bit is then transmitted through the transmit data out line 200 to the select data out circuit 94, which is indicated by I/O block 272. The parity register B1R5 is updated, as indicated by process block 273, and the contents of the transmit data out register B1R3 are moved to the accumulator in preparing the next bit for transmission. The first data bit from the central processor 2 is received at the input T1, as indicated by decision block 274, where it is tested to determine whether it is a binary "0" or a binary "1." If it is a binary "0," the received data bit is stored in the received data register B1R4, as indicated by process block 275. If the received data bit is a binary "1," the rack interface processor 130 branches, as indicated by process block 276, to update the parity flag F0 and to then store the received data bit in the received data register B1R4. The next data bit is then prepared for transmission, as indicated in process block 277, by rotating the data byte which is being held in the accumulator, one bit to the right, by masking the bit to be transmitted, and then storing that bit in the second port register B1R2. The serial data out mask is stored in register B1R6.

Blocks 271-277 are then repeated for bits "2-7" of the received data byte and the transmitted data byte during the byte transmission time.

Referring to FIG. 9c, and FIGS. 1, 3, 10 and 11, the eighth data bit is then transmitted, as indicated in block 278, and the parity bit is readied for transmission, as indicated by process block 279, in the P2 output register B1R2. The eighth bit of data received from the central processor 2 is tested, as indicated by decision block 280, to determine if it is a binary "1" or a binary "0." If it is a binary "0" it is stored, as shown by process block 281, in the received data register B1R4. If it is a binary "1," the rack interface processor 130 branches to a process block 282, where the parity flag F0 is updated before the bit is stored in the receive data register B1R4. As represented in process block 283, the parity stored in register B1R5 is transferred into the accumulator, and the parity and transmit data out registers, B1R3 and B1R5, respectively, are cleared.

Eight data bits have been received and transmitted during eight bit transmission times. The rack interface processor 130 then executes the following blocks of instructions during a parity bit time and four stop bit times. Although there are four stop bit times, only two stop bits are tested during these four bit times.

Referring to FIG. 9d, and FIGS. 1, 3, and 10-12, the parity bit is then transmitted back to the central processor 2, as indicated in I/O block 284. As shown by decision block 285, the parity bit received from the central processor 2 through the I/O scanner circuit 3 is tested for its binary identity. If it is a binary "1," the parity flag bit F0 is updated, as indicated in process block 286, before the next decision block 287 is reached. If it is a binary 0, the rack interface processor 130 continues, as indicated by decision block 287, and determines whether the next absolute byte has a slot address that is within the range of this I/O interface rack 16. As shown in decision block 288, if the slot is not within the range of this I/O interface rack 16, the rack interface processor 130 tests the select data out bit, which is the third highest bit in the absolute byte 247. If this bit is a binary "1," a stop bit is transmitted as shown in I/O block 289. The next process block 290 indicates that the current slot address is stored in register B1R7. If the select data out bit is a binary "0," the rack interface processor 130 branches to store a "0" in bit "4" of the second port register B1R2, as shown in a following process block 291. The select data out line 201 will then be at a logic high voltage when serial data coming from other I/O racks 17-19 is to be selected over the contents of register B1R2. A stop bit is then transmitted as shown in I/O block 292.

On the other hand, if the slot in the next absolute byte is within the range of this I/O interface rack 16 in decision block 287, then it must be determined via another decision block 293 whether one of an adjoining pair of even and odd input module slots is empty. This must be determined because the I/O scanner circuit 3 couples 16-bit data words to the I/O image tables 4, 5 in the central memory 1. If bit "4" is a binary "1," one of an adjoining pair of even and odd slots is empty, and yet a transmission must be made for the empty slot. A first stop bit is transmitted as shown in I/O block 294, and the addressed slot is enabled, as shown in process block 295, so that it can be determined, as shown in decision block 296, whether an input module is present. If the input module is not present, a second stop bit is stored in register B1R7, as shown in process block 297, and register B1R3 is loaded with all 0's, as shown in process block 298, so that all 1's are transmitted back towards the central processor 2. If an input module is present, a second stop bit is stored in register B1R7, as shown in process block 299, and data from the addressed slot is read into the accumulator and then stored in the transmit data out register B1R3, as shown in I/O block 300.

Returning to the decision block 293, if bit "4" of the absolute byte is a binary "0," a stop bit is transmitted to the central processor 2 during I/O block 301, and the addressed slot is enabled, as shown in the next process block 302, to prepare for an input module test in decision block 303. If an input module is present, a second stop bit is stored in register B1R7, as represented by process block 299 and the input data is read from the slot, as shown in I/O block 300, before the rack interface processor 130 continues to process block 290. If an input module is not present in decision block 303, a second stop bit is stored in register B1R7, as shown in process block 304, and the rack interface processor 130 returns to execute process block 290.

After a first stop bit has been transmitted and after the slot address and a second stop bit have been stored in register B1R7, the rack interface processor 130 checks data coming from both the central processor 2, and the other I/O rack adapters 40-42 for two consecutive stops bits at a logic high voltage level. Referring to FIG. 9e, and FIGS. 1, 3, 10 and 11, data coming through the input line 21' from the next rack adapter 40 is checked first at monitoring input T0, as shown in decision block 305. If a logic low voltage signal indicating a bad stop bit is detected, this result is stored in flag F1, as shown in process block 306. This flag was cleared previously during process block 268 in FIG. 9b. If a logic high signal is detected at input T0, the data received at input T1 from the central processor 2 is checked for a first stop bit in decision block 307. If a logic low voltage signal or binary "0" is detected at input T1, the rack interface processor 130 branches to test for a second low stop bit in decision block 308. Incoming data from the central processor 2 can be checked at terminal P27 which is connected to input T1 on the rack interface processor 130. If a second low stop bit is detected at this terminal P27, the rack interface processor 130 exits to a fault routine ER4 for this particular type of fault in transmission.

If a logic high voltage signal or binary "1" is detected at terminal P27 during decision block 308, the rack interface processor 130 determines, as shown in decision block 309, whether this is a second transmission error in two successive I/O scans. This is determined by testing bit "6" in the absolute byte for the slot being scanned. If bit "6" is a binary "1" in decision block 309, the rack interface processor 130 exits to a fault routine ER5 for a fault caused by two transmission errors for the same slot on two successive I/O scans. If bit "6" in the absolute byte is a binary "0," bit "6" is set, as shown in process block 310 to record the transmission error in this I/O scan. The rack interface processor 130 then bypasses an I/O block 311 in which a byte of data received during this transmission time would be written into the slot being scanned. In this way, faulty data which is received from the central processor 2 is not allowed to affect the status of the output devices on the controlled machine 28.

Returning to decision block 307, if the first stop bit tested at input T1 is a good stop bit as indicated by a logic high voltage signal, a second stop bit is tested at terminal P27, as shown in decision block 312 in the same manner as in decision block 308. If this second stop bit is at a logic low voltage level, the rack interface processor 130 again branches to decision block 309 to determine whether an error was recorded on a previous I/O scan. Depending upon the result of that test, the rack interface processor 130 either exits to the fault routine ER5 or sets bit "6" of the absolute byte in process block 310.

If the stop bit tested in decision block 312 is a logic high voltage signal, two good stop bits have been received. It is still necessary, however, to test for a parity error in decision block 313. If a parity error is detected, the rack interface processor 130 again branches to decision block 309 to determine whether this is the first or second transmission error that has occurred. If there is no parity error detected in decision block 313, the data that has been received from the central processor and stored in the received data register B1R4 is written into the slot being scanned during I/O block 311.

Figure 9F:
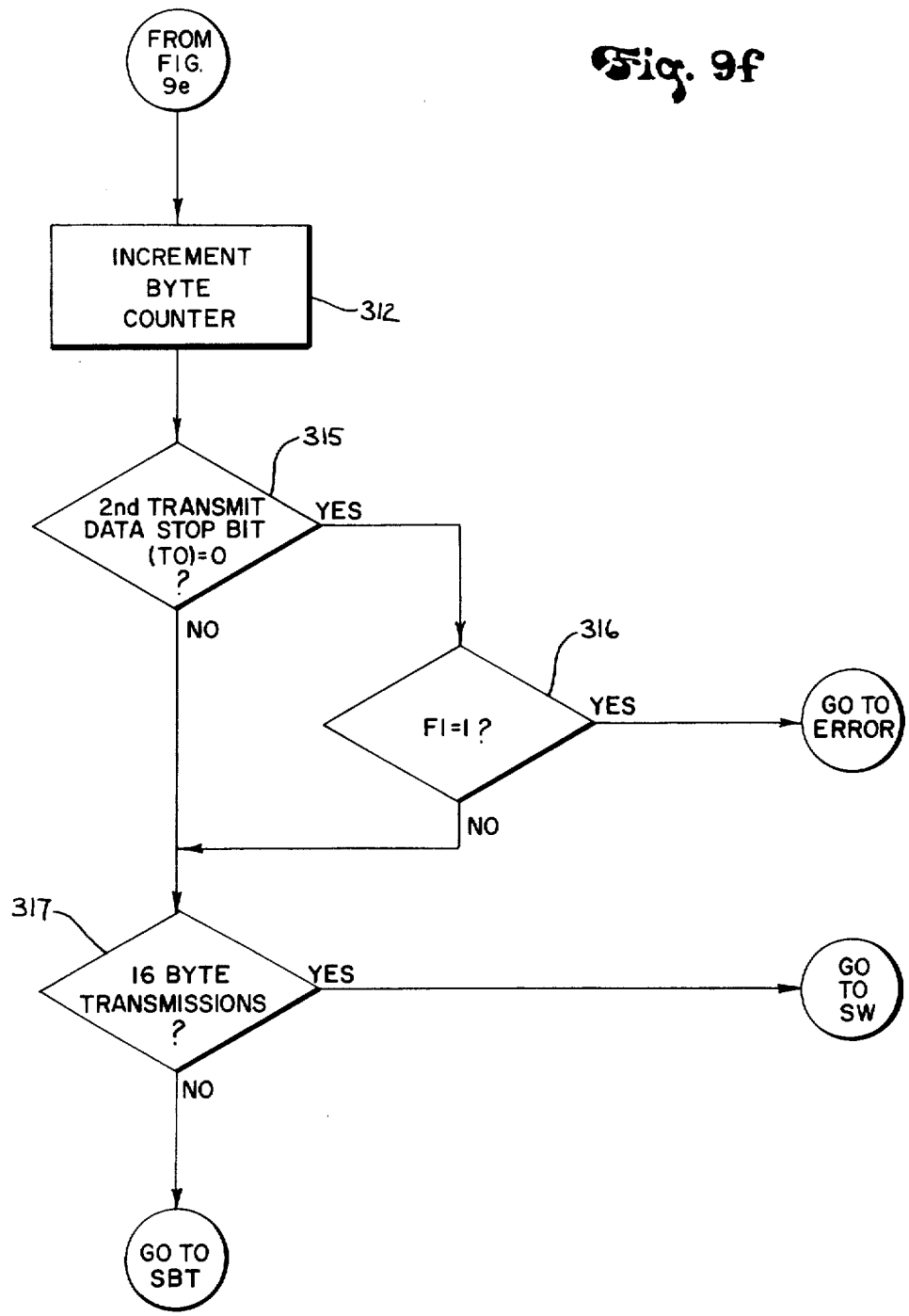
Figure 9H:
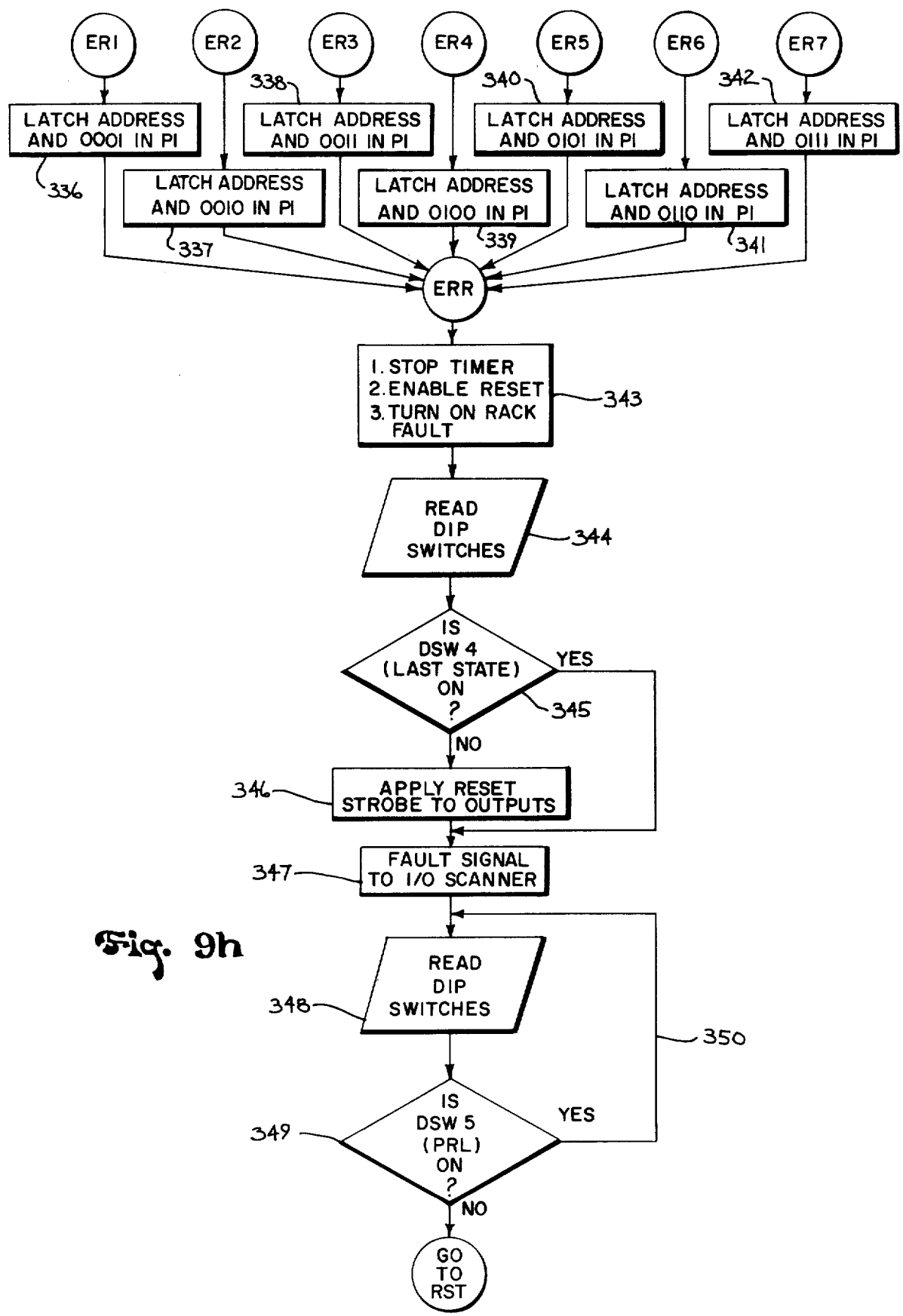

Continuing in FIG. 9f, the absolute byte counter in register B1R0 is incremented, as shown in process block 314, and a second stop bit coming through input line 21' on its way to the central processor 2 is tested, as shown by decision block 315. If a logic low voltage signal is received at the T0 input of the rack interface processor 130, the processor 130 next examines flag F1 for a previous error. If a binary "1" is stored in flag F1 in decision block 316, the processor 130 exits to a fault routine ER7 which corresponds to this type of fault in transmission between the I/O interface racks 16-19 and the central processor 2. If the second stop bit tested at input T0 is a logic high signal in decision block 315, or if flag F1 contains a binary 0 in decision block 313, the rack interface processor 130 proceeds, as shown in decision block 317, to test for sixteen byte transmissions. If sixteen byte transmissions have not been completed, the rack interface processor 130 loops back to begin the SBT portion of the control program. If sixteen byte transmissions have been completed, the processor 130 proceeds to the status byte transmission.

Referring to FIG. 9g and FIGS. 1, 3, 10 and 11, the status byte transmission time, SW, begins, as shown in process block 318, in which a status byte start bit is generated and prepared for transmission. As seen in I/O block 319, the status byte start bit is transmitted to the I/O scanner circuit 3. The status byte is then generated and stored in register B1R3, as represented by process block 320. If no errors have been recorded, a 04 (hexadecimal) is loaded into B1R3. This places a binary "1" in bit "2" and binary "0" in bit "1" of the status byte, which will indicate to the I/O scanner circuit 3 that no errors have been recorded. A decision block 321 follows in which the active monitoring line 201 is checked. If the I/O module is not active, as indicated by the signal on the active monitoring line 201, the rack interface processor 130 exits to a fault routine ER6 which corresponds to this particular kind of transmission fault. Otherwise, the program continues, as shown in process block 322, in which the first bit of the status byte is readied for transmission to the I/O scanner circuit 3.

The first status bit is transmitted, as shown in I/O block 323 and the second bit is readied for transmission, as represented in process block 324. The second bit in the status byte is then transmitted, as represented in I/O block 325. As indicated in process block 326, the parity of the transmitted bit is stored in register B1R5, the next bit is readied for transmission, and a delay is introduced to fill out the bit transmission time. After each bit is transmitted, a count is decremented by one and tested, as indicated by decision block 327, to determine whether seven bit transmissions have occurred. The rack interface processor 130 follows a program loop 328 until seven transmissions have occurred, and then proceeds to I/O block 329 where the eighth bit is transmitted. As indicated by process block 330, the status byte parity bit is readied for transmission and as indicated by I/O block 331 the parity bit is transmitted. A delay process block 332 follows the parity bit transmission and precedes I/O instruction block 333 in which a stop bit is transmitted to the I/O scanner circuit 3. The status byte transmission is concluded with a process block 334 in which the rack interface processor 130 delays until the end of the fourth stop bit time.

After the status byte transmission, the rack interface processor 130 enters a dwell transmission time, during which it executes a delay routine before its resynchronization to the central processor 2 at the beginning of each I/O scan interrupt. As represented by the dwell transmission process block 335, the rack processor 130 delays through the tenth bit time, and then resets the transmission loss timer and the absolute byte counter B0R0. The rack processor 130 then returns to the PST portion of the program which determines whether an input module is present and which performs certain other initial preparation, before receiving the start bit for the first byte transmission in the next I/O scan interrupt. This start bit must be received before the transmission loss timer times out and causes an exit to the first fault routine ER1.

Referring to FIG. 9h and FIGS. 1, 3, 10 and 11, the fault routines ER1-ER7 have a common portion ERR. In process blocks 336-342 for the respective routines ER1-ER7 the slot address and the type of fault detected are latched in the first port P1. Each of the routines ER1-ER7 then proceeds to the common portion labeled ERR. As indicated by the first process block 343 of that routine the reset pushbutton 164 is enabled and the rack fault LED 158 is turned on. The status of the DIP switches DSW 0-DSW 7 is then read, as indicated in I/O block 344 and switch DSW 4 is examined to see whether the output devices on the controlled machine 28 are to be deenergized, before they are decontrolled. As represented by decision block 345, if the last state DIP switch DSW 4 is set at a logic low or "on," the devices on the controlled machine are to remain in their last state before a fault was detected, when the machine is decontrolled. If the last state switch DSW 4 is set at a logic high state or "off," a reset strobe is applied, as represented by process block 346, to deenergize the control devices on the controlled machine 28. This is followed by a delay, represented by process block 347, to signal the I/O scanner circuit 3 that a fault has occurred. As indicated in a following I/O instruction block 348, the DIP switches are read again to examine the processor restart lockout DIP switch DSW 5. As indicated by decision block 349, if this switch is set at a logic high or "off," the rack interface processor 130 enters a program loop 350, where it remains until the condition causing the fault is corrected. If the PRL switch DSW 2 is set at a logic low or "on," the rack processor 130 is locked out, and it returns to the RST portion of the program to reinitialize registers and to restart the execution of the program instructions during the next I/O scan interrupt of the central processor 2.

APPENDIX A

Program Listing

| Location | Contents | Label | Processor Instruction | Comments |
|---|---|---|---|---|
| 000 | 00 | | NOOP | No operation. |
| 001 | 00 | | NOOP | |
| 002 | 00 | | NOOP | |
| 003 | 54 | | CALL2,RT | External interrupt |
| 004 | 63 | | | comes here. |
| 005 | 04 | | JMP0,GO | |
| 006 | 09 | | | |
| 007 | 44 | | JMP2,TOUT | Timer/counter interrupt |
| 008 | 66 | | | comes here. |
| 009 | 35 | GO: | DISTI | Disable timer interrupts. |
| 00A | 05 | | ENI | Enable external interrupts. |
| 00B | C5 | | SLRB0 | Select register bank 0. |
| 00C | 23 | | MAI(F0H)* | Initialize ports. |
| 00D | F0 | | | |
| 00E | 39 | | OUTP1 | |
| 00F | BC | | MR4I(C0H) | Preset R4 to select B7, read |
| 010 | 80 | | | bus; B6, no mod strobe; B5 |
| 011 | 23 | | MAI(FAH) | back plane bus; B4, RF indi- |
| 012 | FA | | | cator off. |
| 013 | 3A | | OUTP2 | |
| 014 | 80 | | MXA0 | Float I/O data bus to |
| | | | | read inputs. |
| 015 | A5 | | CLRF1 | Clear flags F0, F1. |
| 016 | 85 | | CLRF0 | |
| 017 | 08 | | INBS | Input DIP switch status. |
| 018 | 37 | | CPLA | Input data and store in |
| 019 | AF | | MR7A | B0R7 (buffers invert data). |
| 01A | 0A | | INP2 | Check for rack adapter |
| | | | | module active. |
| 01B | 53 | | NAI(02H) | |
| 01C | 02 | | | |
| 01D | 32 | | JB1,GO | B1=1, rack adapter module |
| 01E | 09 | | | not active, return to go; |
| | | | | B1=0, rack adapter module |
| | | | | is active, continue. |
| 01F | 99 | ACT: | NP1I,0EFH | Turn off rack fault |
| | | | | indicator. |
| 020 | EF | | | |

*(F0H) is F0 in hexadecimal notation.

Determine Rack Size

| Location | Contents | Label | Processor Instruction | Comments |
|---|---|---|---|---|
| 021 | 23 | | MAI(20H) | Load oF(H) in registers |
| 022 | 20 | | | 20 to 2F. |
| 023 | A9 | | MR1A | |
| 024 | BD | | MR5I(10H) | |
| 025 | 10 | | | |
| 026 | A8 | | MR0A | |
| 027 | 23 | | MAI(0FH) | |
| 028 | 0F | | | |
| 029 | A0 | CAR: | M0A | |
| 02A | 18 | | INCR0 | |
| 02B | ED | | DJNZ5,CAR | |
| 02C | 29 | | | |
| 02D | FF | | MAR7 | Read and mask starting |
| | | | | byte address. |
| 02D | FF | | MAR7 | Read and mask starting byte |
| 02E | 53 | | NAI(0CH) | address bits 2 and 3 and load |
| 02F | 0C | | | into starting byte address |
| 030 | AE | | MR6A | register B0R6. |
| 031 | FF | | MAR7 | |
| 032 | F2 | | JB7,RSA | Branch if bit 7=1. |
| 033 | 3E | | | |
| 034 | D2 | | JB6,RSB | Bit 7=0, branch if bit |
| | | | | 6=1. |
| 035 | 3A | | | |
| 036 | 23 | | MAI(04H) | Bit 6 and 7=0. |
| 037 | 04 | | | |
| 038 | 04 | | JMP0,EBA | Rack size = 32 I/O circuits |
| 039 | 48 | | | (4 bytes), go to EBA. |
| 03A | 23 | RSB: | MAI(08H) | Bit 7=0 bit 6=1. |
| 03B | 08 | | | |
| 03C | 04 | | JMP0,EBA | Rack size = 64 I/O circuits |
| 03D | 48 | | | (8 bytes), go to EBA. |
| 03E | D2 | RSA: | JB6,RSC | Bit 7=1, branch if bit 6=1. |
| 03F | 44 | | | |
| 040 | 23 | | MAI(0CH) | Bit 7=1 bit 6=0. |
| 041 | 0C | | | |
| 042 | 04 | | JMP0,EBA | Rack size = 96 I/O circuits |

APPENDIX A-continued

Program Listing

| Location | Contents | Label | Processor Instruction | Comments |
|---|---|---|---|---|
| 043 | 48 | | | (12 bytes), go to EBA. |
| 044 | 23 | RSC: | MAI,(10H) | Bit 7=1 bit 6=1. |
| 045 | 10 | | | Rack size = 128 I/O circuits (16 bytes), go to EBA. |
| 046 | 00 | | NOOP | |
| 047 | 00 | | NOOP | |
| 048 | AD | EBA: | MRSA | Move the number of slots in this rack into B0R5. |
| 049 | 23 | | MAI(20H) | Load the correct registers |
| 04A | 20 | | | of the absolute byte area |
| 04B | 6E | | AAR6 | with a 1 in bit 7 and with |
| 04C | A8 | | MR0A | the correct slot address |
| 04D | 23 | | MAI(80H) | for this rack in bits 0–3. |
| 04E | 80 | | | |
| 04F | A0 | CBR: | MOA | |
| 050 | 18 | | INCR0 | |
| 051 | 17 | | INCA | |
| 052 | ED | | DJNZ5,CBR | |
| 053 | 4F | | | |
| 054 | 23 | CAS: | MAI(2FH) | Load the remaining slots |
| 055 | 2F | | | in absolute byte area with |
| 056 | A0 | | M0A | 2F(H) to select the correct |
| 057 | F8 | | MAR0 | transmit data out line. |
| 058 | D3 | | XOAI(30H) | |
| 059 | 30 | | | |
| 05A | 18 | | INCR0 | |
| 05B | 96 | | JONZ,CAS | |
| 05C | 54 | | | |
| 05D | 54 | | CALL2,DT0 | Call routine to set up |
| 05E | 6A | | | the absolute byte register for sequential transmission when only 1 input module is present out of a pair of input modules. |
| | | | Delay Routine | |
| 05F | B9 | | MR1I(0AH) | Increment the accumulator |
| 060 | 0A | | | to 256 counts by |
| 061 | 27 | CLA: | CLRA | 10 μsec./sec. count @ 6 MHZ. |
| 062 | 17 | INA: | INCA | then repeat 10 times. |
| 063 | 00 | | NOOP | |
| 064 | 96 | | JONZ,INA | |
| 065 | 62 | | | |
| 066 | E9 | | DJNZ1,CLA | Total dwell time equals |
| 067 | 61 | | | value in R1(10) times 2.56 msec., dwell complete. |
| 068 | BB | | MR3I(0H) | Turn off rack fault indi- |
| 069 | 00 | | | cator during OR operation in PSI. |
| | | | Continue Initialization | |
| 06A | D5 | REST: | SLRB1 | Change to register bank 1. |
| 06B | B8 | | MR0I(20H) | Load B1R0 W/20H. |
| 06C | 20 | | | |
| 06D | B9 | | MR1I(04H) | Point B1R1 to B0R4. |
| 06E | 04 | | | |
| 06F | BA | | MR2I(0FAH) | Initialize register B1R2. |
| 070 | FA | | | |
| 071 | 99 | | NP1I(0BFH) | Disable DIP switch buffers. |
| 072 | BF | | | |
| 073 | F0 | PST: | MA0 | Is slot in rack range? |
| 074 | F2 | | JB7,PS1 | If yes, go to PS1. |
| 075 | 7A | | | |
| 076 | 54 | | CALL2,D25 | |
| 077 | 5C | | | |
| 078 | 04 | | JMP0,MNP | If not, go to module not |
| 079 | 84 | | | present. |
| 07A | 53 | PS1: | NAI(0FH) | Isolate slot enable address. |
| 07B | 0F | | | |
| 07C | 41 | | OA1 | Generate slot enable. |
| 07D | 4B | | OAR3 | Set rack fault. |
| 07E | 39 | | OUTP1 | |
| 07F | 0A | | INP2 | Check P2 for input module present. |
| 080 | 43 | | OAI(82H) | Force receive data line and active line true so it will function as an input. |
| 081 | 82 | | | |
| * 082 | D2 | | JB6,MP1 | If true, go to input module |
| 083 | 8F | | | present MP1. |

APPENDIX A-continued

Program Listing

| Location | Contents | Label | Processor Instruction | Comments |
|---|---|---|---|---|
| 084 | FA | MNP: | MAR2 | Load desired port 2. |
| 085 | 43 | | OAI(01H) | Input module not present, set transmit data out line to mark state and store status in B1R2. |
| 086 | 01 | | | |
| 087 | AA | | MR2A | |
| 088 | 27 | | CLRA | Load transmit data out register B1R3 with 0's, so all ones are sent out when no module is present. |
| 089 | AB | | MR3A | |
| 08A | AD | | MR5A | Store 0's in R5 also. |
| 08B | 00 | | NOOP | |
| 08C | 00 | | NOOP | |
| 08D | 04 | | JMP0,MP2 | |
| 08E | 98 | | | |
| 08F | 53 | MP1: | NAI(0FEH) | Input module is present, set transmit data out line to space state and store status in B1R2. |
| 090 | FE | | | |
| 091 | AA | | MR2A | |
| 092 | 80 | | MXA0 | Float the data bus. |
| 093 | 08 | | INBS | Read input data. |
| 094 | 37 | | CLPA | Invert data (low true). |
| 095 | AB | | MR3A | Store data in B1R3. |
| 096 | 27 | | CLRA | Preset transmitted data parity register. |
| 097 | AD | | MR5A | Store in R5. |
| 098 | 89 | MP2: | OP1I(20H) | Disable I/O data bus. |
| 099 | 20 | | | |
| 09A | 27 | | CLRA | Reset receive data register B1R4 and load serial data out mask into R6. |
| 09B | AC | | MR4A | |
| 09C | 17 | | INCA | |
| 09D | AE | | MR6A | |
| 09E | FA | | MAR2 | Move port 2 register to accumulator. |
| 09F | 25 | | ENTI | |
| 0A0 | 8A | | OP2I(01H) | Change transmit data out line to mark state. |
| 0A1 | 01 | | | |
| 0A2 | 56 | SBD: | JT1,SBD | Dwell till receive start bit. |
| 0A3 | A2 | | | |
| | | | Start Bit Received, Start Transmission Here | |
| 0A4 | 65 | SBT: | STPTC | Stop timer/counter. |
| 0A5 | 85 | | CLRF0 | Clear received data parity flag. |
| 0A6 | 3A | | OUTP2 | Transmit start bit. |
| 0A7 | A5 | | CLRF1 | Clear flag F1 for fault detection test during stop bit times 2 and 3. |
| 0A8 | 0A | | INP2 | |
| 0A9 | 56 | | JT1,SNV | Check for valid start bit: T1=1, not valid, go to SNV; T1=0, valid, continue. |
| 0AA | C0 | | | |
| 0AB | 32 | | JB1,MNA | Rack adapter module active? If B1=1, go to ERR MNA. |
| 0AC | BE | | | |
| 0AD | 80 | | MXA0 | Ready I/O data bus for input. |
| 0AE | BE | | MR6I(01H) | Load R6 with bit mask. |
| 0AF | 01 | | | |
| 0B0 | FE | | MAR6 | Isolate first bit to be sent, which is the least significant bit in R3 (R1=01). |
| 0B1 | 5B | | NAR3 | |
| 0B2 | DA | | XOAR2 | Assemble data to be sent. |
| | | | Start Bit Time Complete | |
| 0B3 | 3A | | OUTP2 | Transmit data bit 1. |
| 0B4 | DD | | XOAR5 | Generate and store transmitted data parity in B1R5. |
| 0B5 | AD | | MR5A | Ready next bit for transmission. |
| 0B6 | FB | | MAR3 | |
| 0B7 | 56 | | JT1,B1A | Read input, if bit=1, go to B1A. |
| 0B8 | C2 | | | |
| 0B9 | 2C | | XCAR4 | Bit=0. |
| 0BA | 27 | | CLRA | Initialize input byte to 00H. |
| 0BB | 2C | | XCAR4 | Store in B1R4. |

APPENDIX A-continued

Program Listing

| Location | Contents | Label | Processor Instruction | Comments |
|---|---|---|---|---|
| 0BC | 04 | | JMP0,B1B | Go to B1B. |
| 0BD | C7 | | | |
| 0BE | 44 | MNA: | JMP2,ER2 | Rack adapter module not active. |
| 0BF | B0 | | | |
| 0C0 | 44 | SNV: | JMP2,ER3 | Start bit invalid. |
| 0C1 | B6 | | | |
| 0C2 | 95 | B1A: | CPLF0 | Toggle parity flag. |
| 0C3 | 2C | | XCAR4 | Get data bits. |
| 0C4 | FE | | MAR6 | Initialize to 01H. |
| 0C5 | 77 | | RRA | Advance bit pointer. |
| 0C6 | 2C | | XCAR4 | Store. |
| 0C7 | 77 | B1B: | RRA | Rotate next bit |
| 0C8 | AB | | MR3A | in R3 for transmission. |
| 0C9 | 5E | | NAR6 | Ready port 2 register |
| 0CA | DA | | XOAR2 | for next transmission. |
| | | | 1st Bit Time Complete | |
| 0CB | 3A | | OUTP2 | Transmit data bit 2. Reference notes in bit 1. |
| 0CC | DD | | XOAR5 | |
| 0CD | AD | | MR5A | |
| 0CE | FB | | MAR3 | |
| 0CF | 56 | | JT1,B2A | Receive data bit 2. |
| 0D0 | D6 | | | |
| 0D1 | 2C | | XCAR4 | |
| 0D2 | 77 | | RRA | |
| 0D3 | 2C | | XCAR4 | |
| 0D4 | 04 | | JMP0,B2B | |
| 0D5 | DB | | | |
| 0D6 | 95 | B2A: | CPLF0 | |
| 0D7 | 2C | | XCAR4 | |
| 0D8 | 17 | | INCA | |
| 0D9 | 77 | | RRA | |
| 0DA | 2C | | XCAR4 | |
| 0DB | 77 | B2B: | RRA | Ready data bit 3 for transmission. |
| 0DC | AB | | MR3A | |
| 0DD | 5E | | NAR6 | |
| 0DE | DA | | XOAR2 | |
| | | | 2nd Bit Time Complete | |
| 0DF | 3A | | OUTP2 | Transmit data bit 3. Reference notes in bit 1. |
| 0E0 | DD | | XOAR5 | |
| 0E1 | AD | | MR5A | |
| 0E2 | FB | | MAR3 | |
| 0E3 | 56 | | JT1,B3A | Receive data bit 3. |
| 0E4 | EA | | | |
| 0E5 | 2C | | XCAR4 | |
| 0E6 | 77 | | RRA | |
| 0E7 | 2C | | XCAR4 | |
| 0E8 | 04 | | JMP0,B3B | |
| 0E9 | EF | | | |
| 0EA | 95 | B3A: | CPLF0 | |
| 0EB | 2C | | XCAR4 | |
| 0EC | 17 | | INCA | |
| 0ED | 77 | | RRA | |
| 0EE | 2C | | XCAR4 | |
| 0EF | 77 | B3B: | RRA | Ready data bit 4 for transmission. |
| 0F0 | AB | | MR3A | |
| 0F1 | 5E | | NAR6 | |
| 0F2 | DA | | XOAR2 | |
| | | | 3rd Bit Time Complete | |
| 0F3 | 3A | | OUTP2 | Transmit data bit 4. Reference notes in bit 1. |
| 0F4 | DD | | XOAR5 | |
| 0F5 | AD | | MR5A | |
| 0F6 | FB | | MAR3 | |
| 0F7 | 56 | | JT1,B4A | Receive data bit 4. |
| 0F8 | FE | | | |
| 0F9 | 2C | | XCAR4 | |
| 0FA | 77 | | RRA | |
| 0FB | 2C | | XCAR4 | |
| 0FC | 24 | | JMP1,B4B | |
| 0FD | 03 | | | |
| 0FE | 95 | B4A: | CPLF0 | |
| 0FF | 2C | | XCAR4 | |
| 100 | 17 | | INCA | |

APPENDIX A-continued

Program Listing

| Location | Contents | Label | Processor Instruction | Comments |
|---|---|---|---|---|
| 101 | 77 | | RRA | |
| 102 | 2C | | XCAR4 | |
| 103 | 77 | B4B: | RRA | Ready data bit 5 for transmission. |
| 104 | AB | | MR3A | |
| 105 | 5E | | NAR6 | |
| 106 | DA | | XOAR2 | |
| | | | 4th Bit Time Complete | |
| 107 | 3A | | OUTP2 | Transmit data 5. Reference notes in bit 1. |
| 108 | DD | | XOAR5 | |
| 109 | AD | | MR5A | |
| 10A | FB | | MAR3 | |
| 10B | 56 | | JT1,B5A | Receive data bit 5. |
| 10C | 12 | | | |
| 10D | 2C | | XCAR4 | |
| 10E | 77 | | RRA | |
| 10F | 2C | | XCAR4 | |
| 110 | 24 | | JMP1,B5B | |
| 111 | 17 | | | |
| 112 | 95 | B5A: | CPLF0 | |
| 113 | 2C | | XCAR4 | |
| 114 | 17 | | INCA | |
| 115 | 77 | | RRA | |
| 116 | 2C | | XCAR4 | |
| 117 | 77 | B5B: | RRA | Ready data bit 6 for transmission. |
| 118 | AB | | MR3A | |
| 119 | 5E | | NAR6 | |
| 11A | DA | | XOAR2 | |
| | | | 5th Bit Time Complete | |
| 11B | 3A | | OUTP2 | Transmit data bit 6. Reference notes in bit 1. |
| 11C | DD | | XOAR5 | |
| 11D | AD | | MR5A | |
| 11E | FB | | MAR3 | |
| 11F | 56 | | JT1,B6A | Receive data bit 6. |
| 120 | 26 | | | |
| 121 | 2C | | XCAR4 | |
| 122 | 77 | | RRA | |
| 123 | 2C | | XCAR4 | |
| 124 | 24 | | JMP1,B6B | |
| 125 | 2B | | | |
| 126 | 95 | B6A: | CPLF0 | |
| 127 | 2C | | XCAR | |
| 128 | 17 | | INCA | |
| 129 | 77 | | RRA | |
| 12A | 2C | | XCAR4 | |
| 12B | 77 | B6B: | RRA | Ready data bit 7 for transmission. |
| 12C | AB | | MR3A | |
| 12D | 5E | | NAR6 | |
| 12E | DA | | XOAR2 | |
| | | | 6th Bit Time Complete | |
| 12F | 3A | | OUTP2 | Transmit data bit 7. Reference notes in bit 1. |
| 130 | DD | | XOAR5 | |
| 131 | AD | | MR5A | |
| 132 | FB | | MAR3 | |
| 133 | 56 | | JT1,B7A | Receive data bit 7. |
| 134 | 3A | | | |
| 135 | 2C | | XCAR4 | |
| 136 | 77 | | RRA | |
| 137 | 2C | | XCAR4 | |
| 138 | 24 | | JMP1,B7B | |
| 139 | 3F | | | |
| 13A | 95 | B7A: | CPLF0 | |
| 13B | 2C | | XCAR4 | |
| 13C | 17 | | INCA | |
| 13D | 77 | | RRA | |
| 13E | 2C | | XCAR4 | |
| 13F | 77 | B7B: | RRA | Ready data bit 8 for transmission. |
| 140 | AB | | MR3A | |
| 141 | 5E | | NAR6 | |
| 142 | DA | | XOAR2 | |
| | | | 7th Bit Time Complete | |
| 143 | 3A | | OUTP2 | Transmit data bit 8. |

APPENDIX A-continued

Program Listing

| Location | Contents | Label | Processor Instruction | Comments |
|---|---|---|---|---|
| | | | | Reference notes in bit 1. |
| 144 | DD | | XOAR5 | |
| 145 | 5E | | NAR6 | Ready parity bit for transmission. |
| 146 | DA | | XOAR2 | |
| 147 | 56 | | JT1,B8A | Receive data bit 8. |
| 148 | 4E | | | |
| 149 | 2C | | XCAR4 | |
| 14A | 77 | | RRA | |
| 14B | 2C | | XCAR4 | |
| 14C | 24 | | JMP1,B8B | |
| 14D | 53 | | | |
| 14E | 95 | B8A: | CPLF0 | |
| 14F | 2C | | XCAR4 | |
| 150 | 17 | | INCA | |
| 151 | 77 | | RRA | |
| 152 | 2C | | XCAR4 | |
| 153 | 2D | B8B: | XCAR5 | Prepare to clear registers B1R3,B1R5. |
| 154 | 27 | | CLRA | |
| 155 | AB | | MR3A | Clear register B1R3. |
| 156 | 2D | | XCAR5 | Clear transmitted data parity register B1R5, parity bit available for transmission. |
| | | | *8th Bit Time Complete* | |
| 157 | 3A | | OUTP2 | Transmit parity bit. |
| 158 | BF | | MR7I(FEH) | Load R7 with FE(H). |
| 159 | FE | | | |
| 15A | 18 | | INCR0 | Get next slot file. |
| 15B | 56 | | JT1,BPA | Receive parity bit. |
| 15C | 5F | | | |
| 15D | 24 | | JMP1,BPB | |
| 15E | 61 | | | |
| 15F | 95 | BPA: | CPLF0 | Process parity. |
| 160 | 00 | | NOOP | |
| 161 | F0 | BPB: | MA0 | |
| 162 | F2 | | JB7,SOK | If bit 7=1, go to SOK. |
| 163 | 7A | | | |
| 164 | B2 | | JB5,SSO | Slot in range of this rack. If B5=0 select data out from another rack, slot not in rack range. |
| 165 | 6D | | | |
| 166 | 00 | | NOOP | |
| 167 | 00 | | NOOP | |
| 168 | 8A | | OP2I(01H) | Transmit stop bit. |
| 169 | 01 | | | |
| 16A | 00 | | NOOP | |
| 16B | 24 | | JMP1,CP4 | |
| 16C | 74 | | | |
| 16D | 23 | SSO: | MAI(EEH) | Prepare to select data out from another rack; force B0, B4 to 0; B4 selects other transmit data out line; B0 clears B0 to insure mark state. |
| 16E | EE | | | |
| 16F | 8A | | OP2I,01H | Transmit stop bit. |
| 170 | 01 | | | |
| 171 | 5A | | NAR2 | |
| 172 | AA | | MR2A | Must output B1R2 later. |
| 173 | 1A | | INCR2 | Force bit 0 to a "1." |
| 174 | 0A | CP4: | INP2 | Read and store. |
| 175 | AF | | MR7A | |
| 176 | 54 | | CALL2,D17 | |
| 177 | 5F | | | |
| 178 | 24 | | JMP1,CP1 | |
| 179 | A5 | | | |
| 17A | 92 | SOK: | JB4,CP5 | |
| 17B | 8D | | | |
| 17C | 53 | | NAI(0FH) | Slot is within rack range. |
| 17D | 0F | | | |
| 17E | 8A | | OP2I(01H) | Transmit stop bit. |
| 17F | 01 | | | |
| 180 | 41 | | OAI | Isolate slot address. |
| 181 | 39 | | OUTP1 | Enable backplane signals. |
| 182 | 0A | | INP2 | |
| 183 | D2 | | JB6,MP3 | Read P2 and check for input module present. |
| 184 | 9E | | | |

APPENDIX A-continued

Program Listing

| Location | Contents | Label | Processor Instruction | Comments |
|---|---|---|---|---|
| | | | | If present, go to MP3. If not present, then set |
| 185 | 2A | | XCAR2 | port 2 register to mark |
| 186 | 4E | | OAR6 | state. |
| 187 | 2A | | XCAR2 | |
| 188 | AF | | MR7A | Store stop bit in B1R7. |
| 189 | 00 | | NOOP | |
| 18A | 00 | | NOOP | |
| 18B | 24 | | JMP1,CP1 | |
| 18C | A5 | | | |
| 18D | 53 | CP5: | NAI(0FH) | Select this path when an |
| 18E | 0F | | | input transmission must take place even with the absence of an input module. |
| 18F | 8A | | OP2I(01H) | Transmit stop bit. |
| 190 | 01 | | | |
| 191 | 41 | | OA1 | Isolate slot address. |
| 192 | 39 | | OUTP1 | Enable backplane signals. |
| 193 | 0A | | INP2 | Read and check for input module present. |
| 194 | D2 | | JB6,MP3 | If B6=1, go to MP3. |
| 195 | 9E | | | If B6=0, continue. |
| 196 | 2A | | XCAR2 | Set part 2 register to |
| 197 | 5F | | NAR7 | space state. |
| 198 | 2A | | XCAR2 | |
| 199 | AF | | MR7A | Store stop bit in B1R7. |
| 19A | BB | | MR3I(00H) | Transmit zeroes. |
| 19B | 00 | | | |
| 19C | 24 | | JMP1,CP1 | |
| 19D | A5 | | | |
| 19E | 2A | MP3: | XCAR2 | Set port 2 register to |
| 19F | 5F | | NAR7 | space state. |
| 1A0 | 2A | | XCAR2 | |
| 1A1 | AF | | MR7A | Store stop bit in B1R7. |
| 1A2 | 08 | | INBS | Read input slot data. |
| 1A3 | 37 | | CPLA | Invert data (low true). |
| 1A4 | AB | | MR3A | Store data in transmit data out register B1R3. |
| | | | 1st Stop Bit Time Complete Plus 5 μsec. | |
| 1A5 | C8 | CP1: | DECR0 | Select previous absolute byte. |
| 1A6 | F0 | | MA0 | Isolate and store this |
| 1A7 | 53 | | NAI(0FH) | slot address. |
| 1A8 | 0F | | | |
| 1A9 | 2F | | XCAR7 | Save in B1R7 and get first stop bit from B1R7. |
| 1AA | 26 | | JNT0,TDC | Check transmit data from |
| 1AB | AE | | | other racks for two consecu- |
| 1AC | 24 | | JMP1,CP0 | tive valid stop bits. |
| 1AD | B0 | | | |
| 1AE | B5 | TDC: | CPLF1 | If B0=0, complement F1; |
| 1AF | 00 | | NOOP | If B0=1, do not alter F1. |
| 1B0 | 46 | CP0: | JNT1,ES1 | Check received data for stop bits. |
| 1B1 | B6 | | | If T1=1, check B7 of B1R7: if B7=1, 2 good stop bits, go to ES3; if B7=0, 1 stop bit BAD, go to ES2, ES5. If T1=0, go to ES1, check B7 of B1R7; if B7=1, 1 stop bit bad, go to ES2, ES5; if B7=0, 2 bad stop bits, go to ERF, ER7. |
| 1B2 | F2 | | JB7,ES3 | |
| 1B3 | C6 | | | |
| 1B4 | 24 | ES2: | JMP1,ES5 | |
| 1B5 | BA | | | |
| 1B6 | E2 | ES1: | JB7,ES2 | |
| 1B7 | B4 | | | |
| 1B8 | 44 | | JMP2,ER4 | 2 low stop bits from central processor. |
| 1B9 | BC | | | |
| 1BA | F0 | ES5: | MA0 | Check previous transmission for error. |
| 1BB | D2 | | JB6,ES4 | B6=0, error this scan only. |
| 1BC | C4 | | | Update fault tolerance bit, |

APPENDIX A-continued

Program Listing

| Location | Contents | Label | Processor Instruction | Comments |
|---|---|---|---|---|
| | | | | go to CP2. |
| | | | | B6=1, 2 consecutive errors (major fault), go to ES4. |
| 1BD | 43 | | OAI(40H) | |
| 1BE | 40 | | | |
| 1BF | A0 | | M0A | |
| 1C0 | 54 | | CALL2,D17 | |
| 1C1 | 5F | | | |
| 1C2 | 24 | | JMP1,CP2 | |
| 1C3 | D5 | | | |
| 1C4 | 44 | ES4: | JMP2,ER5 | 2 consecutive errors, go to ER5 fault routine. |
| 1C6 | B6 | ES3: | JF0,ES5 | Check parity: if F0=1, parity error, go to ES5; if F0=0, no parity error. |
| 1C8 | FC | | MAR4 | Position received data. |
| 1C9 | 37 | | CPLA | Invert (low true). |
| 1CA | 02 | | OUTBS | Output to backplane. |
| 1CB | FF | | MAR7 | Enable and write |
| 1CC | 39 | | OUTP1 | lines active. |
| 1CD | F0 | | MA0 | Load slot address and error flag. |
| 1CE | 53 | | NAI(BFH) | Reset and store. |
| 1CF | BF | | | |
| 1D0 | A0 | | M0A | 2 consecutive error flag. |
| 1D1 | 9A | | NP2I(F7H) | Strobe on, 5 μsec. |
| 1D2 | F7 | | | |
| 1D3 | 8A | | OP2I(08H) | Strobe off. |
| 1D4 | 08 | | | |
| 1D5 | 89 | CP2: | OP1I(A0H) | Disable port 1 lines. |
| 1D6 | A0 | | | |
| | | | 3rd Stop Bit Plus 7.5 μsec. Complete | |
| 1D7 | 23 | | MAI(D0H) | Increment byte counter. |
| 1D8 | D0 | | | |
| 1D9 | 26 | | JNT0,TDD | Check transmit data for 2 |
| 1DA | DD | | | |
| 1DB | 24 | | JMP1,CP3 | consecutive stop bits. |
| 1DC | DF | | | |
| 1DD | 76 | TDD: | JF1,ERF | Jump if 2 low stop bits from next adapter down line. |
| 1DE | E6 | | | |
| 1DF | 18 | CP3: | INCR0 | Mask to determine if 16 bytes transmissions have occurred. |
| 1E0 | 68 | | AAR0 | |
| 1E1 | C6 | | JOZ,GSW | |
| 1E2 | FF | | | If data in accumulator = 0, generate status word (GSW). If data in accumulator does not = 0, continue. |
| 1E3 | FA | | MAR2 | Move port 2 register status to the accumulator. |
| 1E4 | 04 | | | |
| 1E5 | A4 | | | |
| 1E6 | 44 | ERF: | JMP2,ER7 | |
| 1E7 | CE | | | |
| | | | Status Byte Transmission Time | |
| 1FF | FA | GSW: | MAR2 | Generate status byte start bit. |
| 200 | 43 | | OAI,10H | Select this module. |
| 201 | 10 | | | |
| 202 | 53 | | NAI,0FEH | |
| 203 | FE | | | |
| 204 | 3A | | OUTP2 | Transmit status byte start bit. |
| 205 | BB | | MR3I(04H) | |
| 206 | 04 | | | |
| 207 | AA | | MR2A | Save port 2 register contents. |
| 208 | 0A | | INP2 | Check for rack adapter |
| 209 | 32 | | JB1,ERN | module active. |
| 20A | 54 | | | |
| 20B | BE | | MR6I(01H) | |
| 20C | 01 | | | |
| 20D | BF | | MR7I(07H) | |
| 20E | 07 | | | |
| 20F | FE | | MAR6 | |
| 210 | 5B | | NAR3 | Prepare to send first bit. |
| 211 | DA | | XOAR2 | |
| | | | Start Bit Time Complete | |
| 212 | 3A | SWT: | OUTP2 | Transmit status byte |

APPENDIX A-continued

Program Listing

| Location | Contents | Label | Processor Instruction | Comments |
|---|---|---|---|---|
| | | | | data bits 1-7. |
| 213 | DD | | XOAR5 | Generate and store |
| 214 | AD | | MR5A | parity. |
| 215 | FB | | MAR3 | Ready next |
| 216 | 77 | | RRA | bit for |
| 217 | AB | | MR3A | transmission. |
| 218 | 5E | | NAR6 | Ready accumulator to send |
| 219 | DA | | XOAR2 | next bit. |
| 21A | 54 | | CALL2,D12 | |
| 21B | 61 | | | |
| 21C | EF | | DJNZ7,SWT | |
| 21D | 12 | | | |
| 21E | 3A | | OUTP2 | Transmit data bit 8. |
| 21F | DD | | XOAR5 | Prepare parity bit. |
| 220 | 54 | | CALL2,D27 | |
| 221 | 5B | | | |
| 222 | 5E | | NAR6 | |
| 223 | DA | | XOAR2 | |
| 224 | 3A | | OUTP2 | Transmit parity bit. |
| 225 | 27 | | CLRA | |
| 226 | AD | | MR5A | |
| 227 | AF | | MR7A | |
| 228 | 54 | | CALL2,D27 | |
| 229 | 5B | | | |
| 22A | 8A | | OP2I,01H | Transmit first stop bit. |
| 22B | 01 | | | |
| 22C | 54 | | CALL2,D30 | |
| 22D | 5A | | | |
| 22E | 54 | | CALL2,D40 | 2nd stop bit time. |
| 22F | 56 | | | |
| 230 | 54 | | CALL2,D40 | 3rd stop bit time. |
| 231 | 56 | | | |
| 232 | 54 | | CALL2,D40 | 4th stop bit time. |
| 233 | 56 | | | |
| | | | Start Dwell Transmission | |
| 234 | 54 | | CALL2,D40 | Equates to start bit time. |
| 235 | 56 | | | |
| 236 | 54 | | CALL2,D40 | Equates to fist data |
| 237 | 56 | | | bit time. |
| 238 | 54 | | CALL2,D40 | Equates to second data |
| 239 | 56 | | | bit time. |
| 23A | 54 | | CALL2,D40 | Equates to third data |
| 23B | 56 | | | bit time. |
| 23C | 54 | | CALL2,D40 | Equates to fourth data |
| 23D | 56 | | | bit time. |
| 23E | 54 | | CALL2,D40 | Equates to fifth data |
| 23F | 56 | | | bit time. |
| 240 | 54 | | CALL2,D40 | Equates to sixth data |
| 241 | 56 | | | bit time. |
| 242 | 54 | | CALL2,D40 | Equates to seventh data |
| 243 | 56 | | | bit time. |
| 244 | 54 | | CALL2,D40 | Equates to eighth data |
| 245 | 56 | | | bit time. |
| 246 | 54 | | CALL2,D40 | Equates to ninth data |
| 247 | 56 | | | bit time. |
| 248 | 8A | | OP2I,10H | Initialize select data out to select data from this I/O interface rack. |
| 249 | 10 | | | |
| 24A | 23 | | MAI,0E7H | |
| 24B | E7 | | | |
| 24C | 62 | | MTA | Load transmission loss timer. |
| 24D | B8 | | MR0I(20H) | Reset absolute byte slot center. |
| 24E | 20 | | | |
| 24F | BB | | MR3I(0H) | Turn off rack fault indicator. |
| 250 | 00 | | | |
| 251 | 55 | | STRTT | Start timer. |
| 252 | 04 | | JMP0,PST | Go to prepare slot for data transmission. |
| 253 | 73 | | | |
| 254 | 44 | ERN: | JMP2,ER6 | |
| 255 | C8 | | | |
| | | | Delay Routine | |
| 256 | 00 | D40: | NOOP | 40 μsec. |
| 257 | 00 | D37: | NOOP | 37.5μsec. |
| 258 | 00 | D35: | NOOP | 35 μsec. |

APPENDIX A-continued

Program Listing

| Location | Contents | Label | Processor Instruction | Comments |
|---|---|---|---|---|
| 259 | 00 | D32: | NOOP | 32.5 μsec. |
| 25A | 00 | D30: | NOOP | 30 μsec. |
| 25B | 00 | D27: | NOOP | 27.5 μsec. |
| 25C | 00 | D25: | NOOP | 25 μsec. |
| 25D | 00 | D22: | NOOP | 22.5 μsec. |
| 25E | 00 | D20: | NOOP | 20 μsec. |
| 25F | 00 | D17: | NOOP | 17.5 μsec. |
| 260 | 00 | D15: | NOOP | 15 μsec. |
| 261 | 00 | D12: | NOOP | 12.5 μsec. |
| 262 | 83 | D10: | RETU | 10 μsec. |
| | | | Interrupt Routine | |
| 263 | 65 | RT: | STPTC | Stop timer. |
| 264 | 35 | | DISTI | Disable timer interrupt. |
| 265 | 93 | | RETR | Reenable interrupts. |
| | | | Time Out Routine | |
| 266 | 54 | TOUT: | CALL2,RT | |
| 267 | 63 | | | |
| 268 | 44 | | JMP2,ER1 | Time out routine. |
| 269 | AA | | | |
| | | | Routine To Correct For Multiple Transmissions When Only 1 of 2 Input Modules Are Present | |
| 26A | B8 | DT0: | MR0I(20H) | Reset absolute byte counter. |
| 26B | 20 | | | |
| 26C | B9 | | MR1I(10H) | |
| 26D | 10 | | | |
| 26E | F0 | DT1: | MA0 | Slot in rack range? |
| 26F | F2 | | JB7,DT2 | If B7=1, go to DT2. |
| 270 | 7C | | | |
| 271 | 18 | | INCR0 | If B7=0, dwell for 2 |
| 272 | 54 | | CALL2,D40 | absolute byte register |
| 273 | 56 | | | check times and |
| 274 | 54 | | CALL2,D40 | advance B1R0. |
| 275 | 56 | | | |
| 276 | 54 | | CALL2,D40 | |
| 277 | 56 | | | |
| 278 | 54 | | CALL2,D35 | |
| 279 | 58 | | | |
| 27A | 44 | | JMP2,DT5 | |
| 27B | A3 | | | |
| 27C | 53 | DT2: | NAI(0FH) | Isolate slot address and |
| 27D | 0F | | | check for input module |
| 27E | 4C | | OAR4 | present. |
| 27F | 39 | | OUTP1 | |
| 280 | 0A | | INP2 | |
| 281 | D2 | | JB6,DT3 | If B6=1, input module is |
| 282 | 90 | | | present, go to DT3. |
| 283 | 18 | | INCR0 | If B6=0, not present, check |
| 284 | F0 | | MA0 | for input module present in |
| 285 | 53 | | NAI,0FH | next absolute byte register. |
| 286 | 0F | | | |
| 287 | 4C | | OAR4 | |
| 288 | 39 | | OUTP1 | |
| 289 | 0A | | INP2 | |
| 28A | D2 | | JB6,DT4 | If B6=1, input module present, |
| 28B | 9B | | | go to DT4; |
| 28C | 54 | | CALL2,D15 | If 6=0, not present, dwell |
| 28D | 60 | | | to end of this register time |
| 28E | 44 | | JMP2,DT5 | and go to DT5. |
| 28F | A3 | | | |
| 290 | F0 | DT3: | MA0 | Set bit 4 for this absolute |
| 291 | 49 | | OAR1 | byte register and for next |
| 292 | A0 | | M0A | absolute byte register. |
| 293 | 18 | | INCR0 | |
| 294 | F0 | | MA0 | |
| 295 | 49 | | OAR1 | |
| 296 | A0 | | M0A | |
| 297 | 54 | | CALL2,D25 | |
| 298 | 5C | | | |
| 299 | 44 | | JMP2,DT5 | |
| 29A | A3 | | | |
| 29B | F0 | DT4: | MA0 | Input module present so set |
| 29C | 49 | | OAR1 | B4 in this and previous abso- |
| 29D | A0 | | M0A | lute byte register. |
| 29E | C8 | | DECR0 | |
| 29F | F0 | | MA0 | |
| 2A0 | 49 | | OAR1 | |
| 2A1 | A0 | | M0A | |

APPENDIX A-continued

Program Listing

| Location | Contents | Label | Processor Instruction | Comments |
|---|---|---|---|---|
| 2A2 | 18 | | INCR0 | |
| 2A3 | 18 | DT5: | INCR0 | Advance absolute register |
| 2A4 | F8 | | MAR0 | counter. Check for register |
| 2A5 | D3 | | XOAI(30H) | counter overflow. If R0=30H, |
| 2A6 | 30 | | | routine complete. |
| 2A7 | 96 | | JONZ,DT1 | If not, go to DT1. |
| 2A8 | 6E | | | |
| 2A9 | 83 | | RETU | |
| | | | Error Routine with Diagnostics | |
| 2AA | 99 | ER1: | NP1I(0F0H) | |
| 2AB | F0 | | | |
| 2AC | 89 | | OP1I(01H) | ER1, least significant nibble |
| 2AD | 01 | | | in port 1=1. |
| 2AE | 44 | | JMP2,ERR | ER1 transmission loss time |
| 2AF | D4 | | | out. |
| 2B0 | 99 | ER2: | NP1I(F0H) | |
| 2B1 | F0 | | | |
| 2B2 | 89 | | OP1I(02H) | ER2, least significant nibble |
| 2B3 | 02 | | | in port 1=2. |
| | | | | ER2 rack adapter module not active in start bit time. |
| 2B4 | 44 | | JMP2,ERR | |
| 2B5 | D4 | | | |
| 2B6 | 99 | ER3: | NP1I(F0H) | |
| 2B7 | F0 | | | |
| 2B8 | 89 | | OP1I(03H) | ER3, least significant nibble |
| 2B9 | 03 | | | in port 1=3. |
| 2BA | 44 | | JMP2,ERR | ER3 start bit not valid. |
| 2BB | D4 | | | |
| 2BC | 99 | ER4: | NP1I(F0H) | |
| 2BD | F0 | | | |
| 2BE | 89 | | OP1I(04H) | ER4, least significant nibble |
| 2BF | 04 | | | in port 1=4. |
| 2C0 | 44 | | JMP2,ERR | ER4, low stop from central |
| 2C1 | D4 | | | processor. |
| 2C2 | 99 | ER5: | NP1I(F0H) | |
| 2C3 | F0 | | | |
| 2C4 | 89 | | OP1I(05H) | ER5, least significant nibble |
| 2C5 | 05 | | | in port 1=5. |
| 2C6 | 44 | | JMP2,ERR | ER5 2 consecutive errors |
| 2C7 | D4 | | | (major fault) in 2 I/O scans. |
| 2C8 | 99 | ER6: | NP1I(F0H) | |
| 2C9 | F0 | | | |
| 2CA | 89 | | OP1I(06H) | ER6, least significant nibble |
| 2CB | 06 | | | in port 1=6. |
| 2CC | 44 | | JMP2,ERR | ER6, rack adapter module not |
| 2CD | D4 | | | active in status byte transmission time. |
| 2CE | 99 | ER7: | NP1I(F0H) | |
| 2CF | F0 | | | |
| 2D0 | 89 | | OP1I(07H) | ER7, least significant nibble |
| 2D1 | 07 | | | in port 1=7. |
| 2D2 | 44 | | JMP2,ERR | ER7, two low stop bits from |
| 2D3 | D4 | | | next rack adapter. |
| 2D4 | 65 | ERR: | STPTC | Stop timer. |
| 2D5 | 35 | | DISTI | Disable timer interrupts. |
| 2D6 | D5 | | SLRB1 | Select register bank 1. |
| 2D7 | 05 | | ENI | Enable reset button. |
| 2D8 | 89 | | OP1I(70H) | Select DIP switches. |
| 2D9 | 70 | | | Disable I/O data bus. |
| | | | | Turn on rack fault LED. |
| 2DA | 8A | | OP2I(01H) | Force transmit data out |
| 2DB | 01 | | | line to mark state. |
| 2DC | 80 | | MXA0 | Float I/O data bus for input. |
| 2DD | 08 | | INBS | Read DIP switches. |
| 2DE | 92 | | JB4,NRST | DSW4 on, no reset. |
| 2DF | E4 | | | |
| 2E0 | 8A | | OP2I(04H) | If off, reset for |
| 2E1 | 04 | | | |
| 2E2 | 9A | | NP2I(FBH) | 5 μsec. |
| 2E3 | FB | | | |
| 2E4 | BB | NRST: | MR3I(FFH) | Delay 10 msec. to |
| 2E5 | FF | | | |
| 2E6 | 54 | DLAY: | CALL2,D40 | cause scanner error. |
| 2E7 | 56 | | | |
| 2E8 | EB | | DJNZ3,DLAY | |
| 2E9 | E6 | | | |

APPENDIX A-continued

Program Listing

| Location | Contents | Label | Processor Instruction | Comments |
|---|---|---|---|---|
| 2EA | 08 | LOOP: | INBS | Look at DSW5. |
| 2EB | 37 | | CPLA | |
| 2EC | B2 | | JB5,LOOP | Loop if processor is to be locked out. |
| 2ED | EA | | | |
| 2EE | BB | | MR3I(10H) | |
| 2EF | 10 | | | |
| 2F0 | 04 | | JMP0,REST | |
| 2F1 | 6A | | | |
| | | | END | |

APPENDIX B

Component Listing

| Component | Reference Numbers | Description |
|---|---|---|
| Rack interface processor | 130 | Intel 8048 microcomputer manufactured by Intel Corporation |
| PROM | 145 | |
| RAM | 146 | |
| D-type flip-flop | 140 | SN74LS74 flip-flop manufactured by Texas Instruments, Inc. |
| Clock line inverter | 139 | SN7406 hex inverter/buffer/driver manufactured by Texas Instruments, Inc. |
| Receiving line NAND gate | 66 | SN74LS38 quad NAND buffers with open collectors manufactured by Texas Instruments, Inc. |
| Select data circuit NAND gates | 206,208 | |
| Reset NAND gate | 153 | |
| Read/write inverters | 184–185 and 190–191 | SN74LS04 hex inverters manufactured by Texas Instruments, Inc. |
| Read and write NAND gates | 193 and 196 | SN74LS38 quad NAND with open collectors manufactured by Texas Instruments, Inc. |
| Rack fault NAND gate | 153 | |
| Data shaper NAND gates | 114, 116, 122 and 125 | SN 74LS00 quad NAND gates manufactured by Texas Instruments, Inc. |
| Data shaper inverters | 112, 118 | SN74LS04 hex inverters manufactured by Texas Instruments, Inc. |
| Termination sensing NAND gates | 236, 238 and 241 | SN74LS00 quad NAND gates manufactured by Texas Instruments, Inc. |
| Termination sensing ex OR gate | 240 | SN74LS86 quad ex OR gates manufactured by Texas Instruments, Inc. |
| Reset circuit transistor | 172 | MPS-3643-S PNP transistor |
| Select data out circuit inverters | 209 and 211 | manufactured by Fairchild Semiconductor |
| Reset circuit transistor | 172 | MPS-3643-S PNP transistor manufactured by |
| Input circuit transistors | 107 and 108 | 2N3904 PNP transistor and 2N3906 NPN transistor manufactured by Texas Instruments, Inc. |
| Optical coupling circuits | 42,55,81 and 82 | Four HP5082-4370 optical coupling isolation circuits manufactured by Hewlett-Packard Co. |
| First set of buffers | 220 | 8304 octal bidirectional buffer-line drivers manufactured by National Semiconductor, Inc. |
| Second set of buffers | 223 | SN74LS240 octal buffer/line drivers manufactured by Texas Instruments, Inc. |
| Decoder | 149 | SN74154 4-line-to-16-line decoder manufactured by Texas Instruments, Inc. |
| DIP switch circuit | 224 | AMP Inc. P/N 435626-5 |

We claim:

1. In a digital controller having a first I/O interface rack with input/output circuits that are adapted to be connected to monitor and control a plurality of I/O devices on a machine, and central processor means which includes means for cyclically coupling multibit I/O data words to and from the input/output circuits in the first I/O interface rack, first input means and first output means for carrying serial data bits between the cyclical coupling means and the first I/O interface rack, and second input means and second output means for carrying serial data bits between a second I/O interface rack and the cyclical coupling means, the improvement in the controller of a rack adapter which allows the second I/O interface rack to be connected in series with the first I/O interface rack, the rack adapter comprising:

first logic circuit means having a first input coupled to the first input means, having a second control input, and having an output coupled to the second output means for coupling serial data bits between the first input means and the second output means;

enabling means connected to the control input on the first logic circuit means to enable the coupling of serial data therethrough;

second logic circuit means having an output coupled to the first output means, having a first input coupled to the second input means to receive serial data bits from the second I/O interface rack, having a second input which receives data bits coupled from the input/output circuits in the first I/O interface rack, and having a third control input which controls the selection of data for transmission to the central processor means;

bit-receiving means coupled to the first input means for receiving a multibit word of serial data from the central processor means;

bit-transmitting means connected to the second input of the second logic circuit means for transmitting a multibit word of serial data to the central processor means;

next-rack-monitoring means coupled to the second input means to receive a multibit word of serial data transmitted from the second I/O interface rack;

data selector control means connected to the third input of the second logic circuit means to generate a signal thereto for enabling the transmission of a multibit word of serial data from a selected one of the I/O interface racks to the central processor means;

data coupling means operatively connecting both the bitreceiving means and the bit-transmitting means to input/output circuits in the first I/O interface rack for coupling multibit words of parallel data therebetween; and fault detection means coupled to the bit-receiving means, and coupled to the next-rack-monitoring means, for detecting faults associated with the multibit word of data received from the central processor means and with the multibit word of data received from the second I/O interface rack.

2. The improvement recited in claim 1, further comprising:

last rack selector means for indicating that the second I/O interface rack is connected in series with the first I/O interface rack to the central processor means; and further comprising termination sensing circuit means, connected to the first input means, and connected to the last rack selector means, and having an output for providing an output signal that is indicative of the termination status of the I/O interface rack and the corresponding setting of the last rack selector means; and further comprising termination indicator means, connected to the output of the termination sensing circuit means, for indicating the termination status of the first I/O interface rack.

3. The improvement recited in claim 1, further comprising:

active slot indicator means, coupled to the data selector means and coupled to the data coupling means, for designating the active slots in the first I/O interface rack; and wherein the data selector control means is responsive to the active slot indicator means to couple data from the active slots in the first I/O interface rack to the central processor means, and to couple data being transmitted to the central processor means from other I/O interface racks when an addressed slot is not active in the first I/O interface rack.

4. The improvement recited in claim 1, further comprising timing means for controlling the rate at which bits are received by the bit-receiving means and at which bits are transmitted by the bit-transmitting means, whereby the communication channel between the central processor means and an I/O interface rack can be extended.

5. The improvement recited in claim 4, wherein the first and second input means each include:

an input line; and input circuit means connected to the input line for receiving data at varying bit rates.

6. The improvement recited in claim 1, further comprising reset means, having an input connected to the fault detection means and having an output connected to the bit-receiving means, the bit-transmitting means, the data selector means and the data coupling means for re-enabling the rack adapter after a fault has occurred.

7. In a digital controller having an I/O interface rack with input/output circuits that are adapted to be connected to monitor and control a plurality of I/O devices on a machine, and central processing means which includes a central memory and means for coupling multibit I/O data words between the central memory and the I/O interface racks through first input/output means connected to a first I/O interface rack and through second input/output means connected to a second I/O interface rack, the improvement in the controller of a rack adapter which allows the second I/O interface rack to be connected in series to the first I/O interface rack, the rack adapter comprising:

first logic circuit means for coupling a multibit word of serial data from the first input/output means to the second input/output means;

second logic circuit means connected between the second input/output means and the first input/output means, for selectively coupling a multibit word of serial data to the first input/output means;

clock means for generating timing signals;

memory means for storing data and a plurality of processor instructions; and rack interface processor means connected to the clock means and coupled to the memory means to execute program instructions that are read sequentially from the memory means, the rack interface processor means also being connected to the first and second input/output means, and having a first plurality of outputs adapted for connection to the input/output circuits to couple address signals to selected groups of input/output circuits, a second plurality of outputs, one of which is connected to the first logic circuit means, and a pair of which are connected to the second logic circuit means, and a third plurality of outputs adapted for connection to the input/output circuits to couple multibit data words to the addressed input/output circuits;

wherein the rack interface processor means executes processor instructions to receive the multibit word of serial data through the first input/output means, and also executes other processor instructions to enable the coupling of the multibit word of serial data through the first logic circuit means to the second input/output means, and also executes other processor instructions to couple multibit data words between groups of input/output circuits and the memory means, and also executes other processor instructions to selectively couple a multibit word of serial data from either the second I/O interface rack or the memory means through the second logic means to the first input/output means, and also executes still other processor instructions to detect faults associated with the receipt of the multibit words of serial data through the first and second input/output means, respectively.

8. The rack adapter circuit of claim 7, further comprising:

last rack selector means for indicating whether a second rack adapter circuit is connected in series to the first rack adapter circuit through the second input/output means; and further comprising termination sensing circuit means connected to the first input/output means, connected to the second input/output means, and connected to the last rack selector means, and having an output for providing an output signal that is indicative of the termination status of the first and second input/output means and the corresponding setting of the last rack selector means; and further comprising termination indicator means, connected to the output of the termination sensing circuit means, for indicating the termination status of its rack adapter circuit.

9. The rack adapter circuit of claim 7, wherein:

the clock means is operable at varying preselected frequencies to control the data bit rate at which serial data bits are received and transmitted by the rack interface processor means; and further comprising input circuit means connected between the rack interface processor means and the input means in both the first and second input/output means, and operable for receiving data at varying data bit rates.

10. The rack adapter circuit of claim 7, further comprising:

active slot indicator means, coupled to the rack interface processor means, for designating the active slots in its associated I/O interface rack; and wherein the rack interface processor means generates signals to the second logic circuit means to selectively couple data bits from the input/output circuits in its associated I/O interface rack and from the second input/output means according to the rack location of the addressed slot.

11. In a programmable controller having central processing means which inputs multibit words of serial data from a plurality of I/O interface racks and outputs multibit words of serial data to the I/O interface racks, the improvement comprising:

a first two-way serial data communication cable connecting the central processor means to a first serial data port on the first one of the I/O interface racks to couple multibit words of serial data therebetween;

a second two-way serial data communication cable connecting a second serial data port on the first I/O interface rack to a first serial data port on a second one of the I/O interface racks to form a first string of I/O surface racks to couple multibit words of serial data therebetween; and wherein the first I/O interface rack includes a plurality of I/O circuits which are adapted to connect to I/O devices on a controlled machine and also includes an adapter circuit which has (a) first means for coupling multibit words of serial data from the first serial data port to the second serial data port, (b) second means for coupling multibit words of serial data from the second serial data port to the first serial data port, (c) third means for coupling multibit words of serial data received at the first serial data port to the I/O circuits in the form of multibit words of parallel data, (d) fourth means for coupling multibit words of parallel data from the I/O circuits to the first serial data port in the form of multibit words of serial data;

(e) fifth means coupled to the second means for detecting faults in data received through the second serial data port; and (f) sixth means coupled to the second and fifth means for interrupting the coupling of data through the first serial data port to the first serial communication cable in response to a fault in data received through the second serial data port.

12. The programmable controller as recited in claim 11 in which a second string of I/O interface racks is formed by a third two-way serial communication cable connecting the central processor means to a third I/O interface rack and by a fourth serial communication cable connecting the third I/O interface rack to a fourth I/O interface rack.

13. The programmable controller as recited in claim 11 in which a third I/O interface rack is connected to a second serial data port on the second I/O interface rack by a third two-way serial communication cable and in which the second I/O interface rack includes means for changing its designation from a terminal rack to an intermediate rack in the string.

14. In a digital controller with a central processing station, with a rack adapter circuit for coupling multibit data words to and from sets of input/output circuits in an I/O interface rack, and with transmission cables for connecting two I/O interface racks in a string, the rack adapter circuit comprising:

a first serial data input circuit and a first serial data output circuit that are adapted to be connected to a first transmission cable going to the central processing station;

a second serial data input circuit and a second serial data output circuit that are adapted to be connected to a second transmission cable going to a second I/O interface rack;

first logic circuit means for coupling data bits from the first serial data input circuit to the second serial data output circuit;

second logic circuit means connected between the second serial data input circuit and the first serial data output circuit, for selectively coupling data bits to the first serial data output circuit;

clock means for generating timing signals;

adapter circuit memory means for storing input/output data and a plurality of processor instructions; and rack interface processor means connected to the clock means and coupled to the memory means to execute processor instructions that are read from the memory means, the rack interface processor means also being connected to receive signals through the first and second serial data input circuits, and having a first plurality of outputs adapted for connection through an I/O address bus to the input/output circuits to couple address signals thereto, and having a second plurality of outputs, one of which is connected to the first logic circuit means, and a pair of which are connected to the second logic circuit means, and having a third plurality of outputs adapted for connection through an I/O data bus to the input/output circuits to couple multibit data words thereto;

wherein the rack interface processor means executes processor instructions to receive words of data in serial data format through the first serial data input circuit and to couple this data to the memory means, and also executes another processor instruction to enable the first logic circuit means to allow such data to be coupled to the second serial data output circuit, and also executes other processor instructions to couple words of data in parallel data format between groups of input/output circuits and the adapter circuit memory means, and also executes other processor instructions to selectively couple words of data in serial data format from either the adapter circuit memory means or the second serial data input circuit through the second logic means to the first serial data output circuit, and also executes still other processor instructions to detect faults associated with the receipt of data bits through the first and second serial data input circuits.

15. The rack adapter circuit of claim 14, further comprising:

last rack selector means for indicating whether a second rack adapter circuit is connected in series to the first rack adapter circuit through the second serial data input and the second serial data output; and further comprising termination sensing circuit means connected to the first serial data input, connected to the second serial data input, and connected to the last rack selector means, and having an output for providing an output signal that is indicative of the termination status of the first serial data input, the second serial data input, and the corresponding setting of the last rack selector means; and further comprising termination indicator means, connected to the output of the termination sensing circuit means, for indicating the termination status of its rack adapter circuit.

16. The rack adapter circuit of claim 14, wherein:

the clock means is operable to varying preselected frequencies to control the data bit rate at which serial data bits are received and transmitted by the rack interface processor means; and wherein each input circuit includes means for receiving data at varying data bit rates.

17. The rack adapter circuit of claim 14, further comprising:

active slot indicator means, coupled to the rack interface processor means, for designating the active slots in its associated I/O interface rack; and wherein the rack interface processor means generates output signals to selectively couple multibit words of data from the input/output circuits in its associated I/O interface rack or from the second serial data input according to the rack location of the addressed slot.

* * * * *

UNITED STATES PATENT AND TRADEMARK OFFICE
CERTIFICATE OF CORRECTION

PATENT NO. : 4,254,473

DATED : March 3, 1981

INVENTOR(S) : Daniel J. Galdun et al

It is certified that error appears in the above—identified patent and that said Letters Patent is hereby corrected as shown below:

Column 7, line 40 - after "first" insert the word --line--.

Column 8, line 61 - "takan" should be --taken--.

Column 16, line 67 - "I/0" should be --I/O--.

Column 27, line 048 - "MRSA" should be --MR5A--.

Column 27, line 050 - "1NCRO" should be --INCRO--.

Column 29, line 094 - "CLPA" should be --CPLA--.

Column 33, line 127 - "XCAR" should be --XCAR4--.

Column 41, line 24D - "center" should be --counter--.

Column 43, line 28C - "6=0" should be --B6=0--.

Column 47, for the component "Optical coupling circuits" reference number "42" should be --52--.

Column 49, line 47 - "bitreceiving" should be --bit-receiving--.

UNITED STATES PATENT AND TRADEMARK OFFICE
CERTIFICATE OF CORRECTION

PATENT NO. : 4,254,473

DATED : March 3, 1981

INVENTOR(S) : Daniel J. Galdun et al

It is certified that error appears in the above—identified patent and that said Letters Patent is hereby corrected as shown below:

Column 52, line 13 - "surface" should be --interface--.

Signed and Sealed this

Second Day of June 1981

[SEAL]

Attest:

RENE D. TEGTMEYER

Attesting Officer  Acting Commissioner of Patents and Trademarks